US009748765B2

(12) United States Patent
Huang et al.

(10) Patent No.: US 9,748,765 B2
(45) Date of Patent: Aug. 29, 2017

(54) LOAD ALLOCATION FOR MULTI-BATTERY DEVICES

(71) Applicant: Microsoft Technology Licensing, LLC, Redmond, WA (US)

(72) Inventors: Bojun Huang, Beijing (CN); Thomas Moscibroda, Beijing (CN); Ranveer Chandra, Bellevue, WA (US); Stephen E. Hodges, Cambridge (GB); Julia L. Meinershagen, Seattle, WA (US); Nissanka Arachchige Bodhi Priyantha, Redmond, WA (US); Anirudh Badam, Redmond, WA (US); Pan Hu, Amherst, MA (US); Anthony John Ferrese, Berkeley, CA (US); Evangelia Skiani, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 14/633,009

(22) Filed: Feb. 26, 2015

(65) Prior Publication Data

US 2016/0254664 A1    Sep. 1, 2016

(51) Int. Cl.
*H02J 7/34* (2006.01)
*H02J 1/00* (2006.01)
*H02J 7/00* (2006.01)

(52) U.S. Cl.
CPC .............. *H02J 1/00* (2013.01); *H02J 7/0003* (2013.01); *H02J 7/0013* (2013.01); *H02J 7/0063* (2013.01)

(58) Field of Classification Search
CPC ........... H02J 1/00; H02J 7/0063; H02J 7/0003
USPC .......................................................... 307/52
See application file for complete search history.

(56) References Cited

U.S. PATENT DOCUMENTS

| 4,145,669 A | 3/1979 | Babcock et al. |
| 5,091,819 A | 2/1992 | Christensen et al. |
| 5,315,228 A | 5/1994 | Hess et al. |
| 5,519,261 A | 5/1996 | Stewart |
| 5,543,245 A | 8/1996 | Andrieu et al. |
| 5,614,332 A | 3/1997 | Pavelle et al. |
| 5,684,404 A | 11/1997 | Millar |
| 5,691,742 A | 11/1997 | O'Connor et al. |

(Continued)

FOREIGN PATENT DOCUMENTS

| CN | 101714629 | 5/2010 |
| CN | 101834320 | 9/2010 |

(Continued)

OTHER PUBLICATIONS

"Advanced Configuration and Power Interface", Retrieved from <http://www.acpi.info/> on Nov. 3, 2014, Jul. 23, 2014, 2 pages.

(Continued)

*Primary Examiner* — Jared Fureman
*Assistant Examiner* — Duc M Pham

(57) ABSTRACT

This document describes techniques and apparatuses of load allocation for multi-battery devices. In some embodiments, these techniques and apparatuses determine an amount of load power that a multi-battery device consumes to operate. Respective efficiencies at which the device's multiple batteries are capable of providing power are also determined. A respective portion of load power is then drawn from each of the batteries based on their respective efficiencies.

20 Claims, 10 Drawing Sheets

(56) References Cited

U.S. PATENT DOCUMENTS

| | | |
|---|---|---|
| 5,705,929 A | 1/1998 | Caravello et al. |
| 5,764,032 A | 6/1998 | Moore |
| 5,818,200 A | 10/1998 | Cummings et al. |
| 5,894,212 A | 4/1999 | Balogh |
| 5,914,585 A | 6/1999 | Grabon |
| 5,963,010 A | 10/1999 | Hayashi et al. |
| 6,139,987 A | 10/2000 | Koo et al. |
| 6,154,012 A | 11/2000 | Drori |
| 6,252,511 B1 | 6/2001 | Mondshine et al. |
| 6,258,473 B1 | 7/2001 | Spillman et al. |
| 6,268,711 B1 | 7/2001 | Bearfield |
| 6,299,998 B1 | 10/2001 | Morris et al. |
| 6,346,794 B1 | 2/2002 | Odaohhara |
| 6,353,304 B1 | 3/2002 | Atcitty et al. |
| 6,417,646 B1 | 7/2002 | Huykman et al. |
| 6,463,495 B1 | 10/2002 | Angelo et al. |
| 6,650,089 B1 | 11/2003 | Freeman et al. |
| 6,710,578 B1 | 3/2004 | Sklovsky |
| 6,771,044 B1 | 8/2004 | Vinciguerra et al. |
| 6,833,792 B1 | 12/2004 | Smith et al. |
| 6,847,191 B1 | 1/2005 | Wang |
| 6,920,404 B2 | 7/2005 | Yamanaka |
| RE38,918 E | 12/2005 | Svensson et al. |
| 6,977,479 B2 | 12/2005 | Hsu |
| 6,992,580 B2 | 1/2006 | Kotzin et al. |
| 7,015,596 B2 | 3/2006 | Pail |
| 7,020,500 B2 | 3/2006 | Saghbini |
| 7,059,769 B1 | 6/2006 | Potega |
| 7,193,334 B2 | 3/2007 | Hiramitsu et al. |
| 7,333,998 B2 | 2/2008 | Heckerman et al. |
| 7,339,348 B2 | 3/2008 | Bui et al. |
| 7,339,353 B1 | 3/2008 | Masias et al. |
| 7,383,451 B2 | 6/2008 | Matsushima et al. |
| 7,415,623 B2 | 8/2008 | Rapps et al. |
| 7,430,675 B2 | 9/2008 | Lee |
| 7,430,679 B2 | 9/2008 | Tevanian, Jr. |
| 7,475,267 B1 | 1/2009 | Cocosel |
| 7,531,989 B2 | 5/2009 | Maireanu |
| 7,574,661 B2 | 8/2009 | Matsuura et al. |
| 7,583,951 B2 | 9/2009 | Gibbs |
| 7,684,942 B2 | 3/2010 | Yun et al. |
| 7,716,500 B2 | 5/2010 | Esliger |
| 7,734,317 B2 | 6/2010 | Patel et al. |
| 7,787,405 B2 | 8/2010 | Dettinger et al. |
| 7,814,348 B2 | 10/2010 | Krajcovic et al. |
| 7,839,121 B2 | 11/2010 | Kim |
| 7,944,662 B2 | 5/2011 | Carkner et al. |
| 8,001,400 B2 | 8/2011 | Fadell |
| 8,001,407 B2 | 8/2011 | Malone et al. |
| 8,032,317 B2 | 10/2011 | Houston et al. |
| 8,063,606 B2 | 11/2011 | Veselic |
| 8,097,355 B2 | 1/2012 | Larsen |
| 8,138,726 B2 | 3/2012 | Partin et al. |
| 8,255,716 B2 | 8/2012 | Mandyam |
| 8,258,748 B2 | 9/2012 | Constien et al. |
| 8,313,864 B2 | 11/2012 | Christensen et al. |
| 8,330,419 B2 | 12/2012 | Kim et al. |
| 8,369,904 B2 | 2/2013 | Bennis et al. |
| 8,386,816 B2 | 2/2013 | Elsilä et al. |
| 8,386,826 B2 | 2/2013 | Newman |
| 8,405,332 B1 | 3/2013 | Krishnamoorthy et al. |
| 8,423,306 B2 | 4/2013 | Duncan |
| 8,427,106 B2 | 4/2013 | Kim et al. |
| 8,456,136 B2 | 6/2013 | Kim et al. |
| 8,471,521 B2 | 6/2013 | Stewart et al. |
| 8,482,254 B2 | 7/2013 | Ho |
| 8,487,473 B2 | 7/2013 | Peterson et al. |
| 8,508,191 B2 | 8/2013 | Kim et al. |
| 8,538,686 B2 | 9/2013 | Gruen et al. |
| 8,594,648 B2 | 11/2013 | Musial et al. |
| 8,598,838 B2 | 12/2013 | Cunico |
| 8,598,849 B2 | 12/2013 | Bhardwaj et al. |
| 8,607,036 B2 | 12/2013 | More et al. |
| 8,624,560 B2 | 1/2014 | Ungar et al. |
| 8,629,652 B2 | 1/2014 | Partovi et al. |
| 8,648,493 B2 | 2/2014 | Park |
| 8,648,567 B2 | 2/2014 | Hoffman |
| 8,665,214 B2 | 3/2014 | Forutanpour et al. |
| 8,686,693 B2 | 4/2014 | Bhowmik et al. |
| 8,732,487 B2 | 5/2014 | Goraczko et al. |
| 8,749,193 B1 | 6/2014 | Sullivan |
| 8,751,845 B2 | 6/2014 | Assad et al. |
| 8,768,567 B2 | 7/2014 | Diab |
| 8,795,875 B2 | 8/2014 | Lee et al. |
| 8,803,479 B2 | 8/2014 | Kim |
| 8,805,764 B1 | 8/2014 | Rhines et al. |
| 8,829,847 B2 | 9/2014 | Eaton et al. |
| 8,833,667 B2 | 9/2014 | Ahn et al. |
| 8,847,551 B2 | 9/2014 | Coe et al. |
| 8,898,485 B2 | 11/2014 | Scott et al. |
| 8,922,329 B2 | 12/2014 | Davis et al. |
| 8,949,629 B2 | 2/2015 | Chakra et al. |
| 8,958,854 B1 | 2/2015 | Morley et al. |
| 8,962,188 B2 | 2/2015 | Zhamu et al. |
| 9,285,851 B2 | 3/2016 | Hodges et al. |
| 9,475,398 B2 | 10/2016 | Borhan et al. |
| 9,696,782 B2 | 7/2017 | Chandra et al. |
| 2001/0010456 A1 | 8/2001 | Kaite et al. |
| 2001/0013767 A1 | 8/2001 | Takemoto |
| 2001/0044332 A1 | 11/2001 | Yamada et al. |
| 2002/0155327 A1 | 10/2002 | Faris |
| 2003/0117143 A1 | 6/2003 | Okada |
| 2003/0149904 A1 | 8/2003 | Kim |
| 2004/0003300 A1 | 1/2004 | Malueg et al. |
| 2004/0095096 A1 | 5/2004 | Melton et al. |
| 2004/0101744 A1 | 5/2004 | Suzuki |
| 2004/0204183 A1 | 10/2004 | Lencevicius |
| 2005/0189949 A1 | 9/2005 | Shimizu et al. |
| 2005/0258686 A1 | 11/2005 | Hiramitsu et al. |
| 2006/0066285 A1 | 3/2006 | Minamiura |
| 2006/0087291 A1 | 4/2006 | Yamauchi |
| 2006/0176017 A1 | 8/2006 | Waguespack |
| 2006/0284618 A1 | 12/2006 | Cho, II et al. |
| 2007/0007823 A1 | 1/2007 | Huang et al. |
| 2007/0050647 A1 | 3/2007 | Conroy et al. |
| 2007/0103114 A1* | 5/2007 | Hoffman .............. F21L 4/085 320/114 |
| 2007/0252552 A1 | 11/2007 | Walrath |
| 2008/0024007 A1 | 1/2008 | Budampati et al. |
| 2008/0075367 A1 | 3/2008 | Winn et al. |
| 2008/0082851 A1 | 4/2008 | Zettler |
| 2008/0137989 A1 | 6/2008 | Ng et al. |
| 2008/0176608 A1 | 7/2008 | Budampati et al. |
| 2008/0201587 A1 | 8/2008 | Lee |
| 2008/0218125 A1 | 9/2008 | Bansal et al. |
| 2008/0234956 A1 | 9/2008 | Mizuno et al. |
| 2008/0263375 A1 | 10/2008 | Sundstrom et al. |
| 2009/0006878 A1 | 1/2009 | Borghetti et al. |
| 2009/0007128 A1 | 1/2009 | Borghetti et al. |
| 2009/0016765 A1 | 1/2009 | Honda |
| 2009/0018785 A1 | 1/2009 | Huseth et al. |
| 2009/0085553 A1 | 4/2009 | Kumar et al. |
| 2009/0295397 A1 | 12/2009 | Barsukov |
| 2010/0070334 A1 | 3/2010 | Monteverde |
| 2010/0106994 A1 | 4/2010 | Challener et al. |
| 2010/0121587 A1 | 5/2010 | Vian et al. |
| 2010/0121588 A1 | 5/2010 | Elder et al. |
| 2010/0123436 A1 | 5/2010 | Herrod et al. |
| 2010/0164430 A1 | 7/2010 | Lu et al. |
| 2010/0174928 A1 | 7/2010 | Borghetti et al. |
| 2010/0201320 A1 | 8/2010 | Coe et al. |
| 2010/0213897 A1 | 8/2010 | Tse |
| 2010/0235007 A1 | 9/2010 | Constien et al. |
| 2010/0304207 A1 | 12/2010 | Krammer |
| 2010/0332876 A1 | 12/2010 | Fields et al. |
| 2011/0016333 A1 | 1/2011 | Scott et al. |
| 2011/0018679 A1 | 1/2011 | Davis et al. |
| 2011/0025258 A1* | 2/2011 | Kim .............. H02J 7/0013 320/106 |
| 2011/0025259 A1 | 2/2011 | Toya et al. |
| 2011/0057617 A1 | 3/2011 | Finberg et al. |
| 2011/0115830 A1 | 5/2011 | Lee et al. |
| 2011/0161690 A1 | 6/2011 | Lin et al. |
| 2011/0171502 A1 | 7/2011 | Kottenstette et al. |

(56) References Cited

U.S. PATENT DOCUMENTS

| | | |
|---|---|---|
| 2011/0181242 A1 | 7/2011 | Lee |
| 2011/0187309 A1 | 8/2011 | Chan et al. |
| 2011/0234166 A1 | 9/2011 | Liu |
| 2011/0250512 A1 | 10/2011 | Friesen et al. |
| 2011/0260686 A1 | 10/2011 | Ford |
| 2011/0264899 A1 | 10/2011 | Evans et al. |
| 2011/0309838 A1 | 12/2011 | Lin |
| 2012/0004875 A1 | 1/2012 | Maeda et al. |
| 2012/0018679 A1 | 1/2012 | Cha et al. |
| 2012/0040210 A1 | 2/2012 | Hermann |
| 2012/0046892 A1 | 2/2012 | Fink |
| 2012/0058805 A1 | 3/2012 | Yoo |
| 2012/0098705 A1 | 4/2012 | Yost et al. |
| 2012/0102407 A1 | 4/2012 | Benario |
| 2012/0102504 A1 | 4/2012 | Iyer |
| 2012/0119705 A1 | 5/2012 | Eberhard et al. |
| 2012/0119746 A1 | 5/2012 | Macris |
| 2012/0144215 A1 | 6/2012 | Naffziger et al. |
| 2012/0144221 A1 | 6/2012 | Naffziger et al. |
| 2012/0150247 A1 | 6/2012 | Meier et al. |
| 2012/0153899 A1 | 6/2012 | Marschalkowski et al. |
| 2012/0188714 A1 | 7/2012 | Von Borck et al. |
| 2012/0309455 A1 | 12/2012 | Klose et al. |
| 2012/0319652 A1 | 12/2012 | Namou et al. |
| 2012/0324578 A1 | 12/2012 | Seinfeld et al. |
| 2013/0009604 A1 | 1/2013 | Bhardwaj et al. |
| 2013/0038274 A1 | 2/2013 | Forsythe |
| 2013/0106357 A1 | 5/2013 | Girard et al. |
| 2013/0143100 A1 | 6/2013 | Bennis et al. |
| 2013/0162430 A1 | 6/2013 | Scherzer et al. |
| 2013/0181511 A1 | 7/2013 | Stewart et al. |
| 2013/0191625 A1 | 7/2013 | Mullens et al. |
| 2013/0191662 A1 | 7/2013 | Ingrassia, Jr. et al. |
| 2013/0221926 A1 | 8/2013 | Furtner |
| 2013/0257377 A1 | 10/2013 | Diamond et al. |
| 2013/0262899 A1 | 10/2013 | Frantz et al. |
| 2013/0275794 A1 | 10/2013 | Annavaram et al. |
| 2013/0325379 A1 | 12/2013 | Nakamura |
| 2013/0346001 A1 | 12/2013 | Park et al. |
| 2013/0346762 A1 | 12/2013 | Hodges et al. |
| 2014/0015488 A1 | 1/2014 | Despesse |
| 2014/0021887 A1 | 1/2014 | Keily et al. |
| 2014/0038054 A1 | 2/2014 | Tojigamori et al. |
| 2014/0043010 A1 | 2/2014 | Salem |
| 2014/0062388 A1 | 3/2014 | Kim |
| 2014/0082384 A1 | 3/2014 | De Cesare et al. |
| 2014/0093779 A1 | 4/2014 | Myung et al. |
| 2014/0095003 A1 | 4/2014 | Phillips et al. |
| 2014/0125344 A1 | 5/2014 | Knight et al. |
| 2014/0155100 A1 | 6/2014 | Baldasare et al. |
| 2014/0162112 A1 | 6/2014 | Ugaji et al. |
| 2014/0181551 A1 | 6/2014 | Rahal-Arabi et al. |
| 2014/0186700 A1 | 7/2014 | Bae et al. |
| 2014/0191693 A1 | 7/2014 | Funaba et al. |
| 2014/0203780 A1 | 7/2014 | Hu et al. |
| 2014/0253023 A1 | 9/2014 | Paryani |
| 2014/0265604 A1 | 9/2014 | Mergener |
| 2014/0266061 A1 | 9/2014 | Wachal |
| 2014/0312828 A1 | 10/2014 | Vo et al. |
| 2014/0375252 A1 | 12/2014 | Ford |
| 2015/0004473 A1 | 1/2015 | Lim et al. |
| 2015/0020016 A1 | 1/2015 | Hanumara et al. |
| 2015/0084602 A1 | 3/2015 | Sawyers et al. |
| 2015/0089261 A1 | 3/2015 | Segawa et al. |
| 2015/0125743 A1 | 5/2015 | Edwards et al. |
| 2015/0188188 A1 | 7/2015 | Zhang et al. |
| 2015/0194707 A1 | 7/2015 | Park |
| 2015/0309547 A1* | 10/2015 | Huang .............. G06F 1/263 307/80 |
| 2015/0329003 A1 | 11/2015 | Li et al. |
| 2015/0351037 A1 | 12/2015 | Brown et al. |
| 2016/0114696 A1 | 4/2016 | Eifert et al. |
| 2016/0231387 A1 | 8/2016 | Hodges et al. |
| 2016/0231801 A1 | 8/2016 | Chandra et al. |
| 2016/0240891 A1 | 8/2016 | Hodges et al. |
| 2016/0241048 A1 | 8/2016 | Badam et al. |
| 2016/0248125 A1 | 8/2016 | Huang et al. |
| 2016/0248266 A1 | 8/2016 | Ferrese et al. |
| 2016/0275400 A1 | 9/2016 | Hodges et al. |
| 2017/0108906 A1 | 4/2017 | Chandra et al. |
| 2017/0139459 A1 | 5/2017 | Badam et al. |
| 2017/0139465 A1 | 5/2017 | Badam |
| 2017/0162899 A1 | 6/2017 | Chandra et al. |

FOREIGN PATENT DOCUMENTS

| | | |
|---|---|---|
| CN | 102230953 | 11/2011 |
| CN | 202424488 | 9/2012 |
| CN | 103226184 | 7/2013 |
| CN | 103683255 | 3/2014 |
| EP | 1798100 | 6/2007 |
| EP | 1906295 | 4/2008 |
| EP | 2296246 | 3/2011 |
| EP | 2590050 | 5/2013 |
| EP | 2682840 | 1/2014 |
| GB | 2446168 | 8/2008 |
| JP | H0410366 | 1/1992 |
| JP | H0684544 | 3/1994 |
| JP | 2009278754 | 11/2009 |
| JP | 2010067436 | 3/2010 |
| JP | 2012243463 | 12/2012 |
| KR | 20070095689 | 10/2007 |
| KR | 20090064813 | 6/2009 |
| KR | 20140140906 | 12/2014 |
| WO | WO-9401914 | 1/1994 |
| WO | WO-9933124 | 7/1999 |
| WO | WO-03021409 | 3/2003 |
| WO | WO-2007127788 | 11/2007 |
| WO | WO-2008133951 | 11/2008 |
| WO | WO-2011127251 | 10/2011 |
| WO | WO-2012109048 | 8/2012 |
| WO | WO-2012140401 | 10/2012 |
| WO | WO-2013019899 | 2/2013 |
| WO | WO-2013052678 | 4/2013 |
| WO | WO-2013060802 | 5/2013 |
| WO | WO-2013145000 | 10/2013 |
| WO | WO-2013163695 | 11/2013 |
| WO | WO-2014098037 | 6/2014 |
| WO | WO-2015029332 | 3/2015 |
| WO | WO-2015123290 | 8/2015 |
| WO | WO-2016149702 | 9/2016 |
| WO | WO-2016197109 | 12/2016 |

OTHER PUBLICATIONS

"Anode active material for Lithium-ion-battery-Gramax", Retrieved from <http://www.ogc.co.jp/e/products/battery/> on Nov. 3, 2014, 2014, 2 pages.

"Anode Materials", Retrieved from <http://www.targray.com/li-ion-battery/anode-materials> on Nov. 3, 2014, Nov. 1, 2010, 2 pages.

"Boltzmann Machines and Deep Belief Networks", Retrieved from <http://plearn.berlios.de/machine_learning/node4.html> on Jun. 22, 2009, 7 pages.

"Cell Trak", Retrieved from <http://celltraksystems.com/monitoring_parameters.html> on Nov. 4, 2014, Aug. 16, 2013, 4 pages.

"Final Office Action", U.S. Appl. No. 12/503,605, Sep. 20, 2012, 12 pages.

"Ford Developers Look to Use Google Prediction API to Optimize Energy Efficiency", Retrieved from <http://corporate.ford.com/news-center/press-releases-detail/pr-ford-developers-look-to-use-google-34591> on Nov. 11, 2014, May 10, 2011, 1 page.

"Notice of Allowance", U.S. Appl. No. 12/503,605, Jul. 23, 2014, 5 pages.

"On-the-Go and Embedded Host Supplement to the USB Revision 2.0 Specification", Retrieved from <<http://www.usb.org/developers/onthego/USB_OTG_and_EH_2-0.pdf>> on Sep. 21, 2009, May 8, 2009, 79 pages.

"Skoda Navigation", Retrieved from <https://skoda.garmin.com/skoda/site/productOverview> on Oct. 27, 2014, Jan. 23, 2014, 1 page.

(56) References Cited

OTHER PUBLICATIONS

"The PASCAL Visual Object Classes Challenges 2008 (VOC2008) Results", Retrieved from <<http://pascallin.ecs.soton.ac.uk/challengesNOC/voc2008/results/index.shtml>> on Jun. 19, 2009, Jun. 22, 2009, 5 pages.

Ackley, et al.,' "A Learning Algorithm for Boltzmann Machines", Cognitive Science 9, pp. 147-169, 1985, 23 pages.

Allen, "Microfabricated Fast-Charging Energy Storage Devices", Retrieved from <http://yprize.upenn.edu/technology/fast-charging-batteries> on Nov. 3, 2014, 2014, 2 pages.

Balan, et al.,' "The Case for Cyber Foraging", In Proceedings of the 10th workshop on ACM SIGOPS European Workshop, Jul. 2002, 6 pages.

Banerjee, "Users and Batteries: Interactions and Adaptive Energy Management in Mobile Systems", In Proceedings of the 9th International Conference on Ubiquitous Computing, Sep. 2007, 18 pages.

Bashash, et al.,' "Battery Health-conscious Plug-in Hybrid Electric Vehicle Grid Demand Prediction", In Proceedings of the ASME Dynamic Systems and Control Conference, Sep. 13, 2010, 9 pages.

Benini, "Battery-Driven Dynamic Power Management of Portable Systems", In Proceedings 13th International Symposium on System Synthesis, Sep. 20, 2000, 6 pages.

Benini, et al.,' "Discharge Current Steering for Battery Lifetime Optimization", In Proceedings of the International Symposium on Low Power Electronics and Design, Aug. 12, 2002, pp. 118-123.

Benini, et al.,' "Extending Lifetime of Portable Systems by Battery Scheduling", In Proceedings of the conference on Design, automation and test in Europe, Mar. 13, 2001, 5 pages.

Chan, et al.,' "A New Battery Model for use with Battery Energy Storage Systems and Electric Vehicles Power Systems", In IEEE Power Engineering Society Winter Meeting, vol. 1, Jan. 23, 2000, 6 pages.

Chang, "The State of Charge Estimating Methods for Battery: A Review", In Proceeding of the ISRN Applied Mathematics, May 12, 2013, 8 pages.

Chen, et al.,' "An Accurate Electrical Battery Model Capable of Predicting Runtime and I-V Performance", In Proceeding of the IEEE Transactions on Energy Conversion, vol. 21, Issue 2, Jun. 5, 2006, 8 pages.

Chiasson, et al.,' "Estimating the State of Charge of a Battery", In Proceedings of IEEE Transactions on Control Systems Technology, vol. 13, Issue 3, Apr. 25, 2005, 6 pages.

Clark, "These solar-Powered Benches Charge Phones for Free", Retrieved from <http://www.wired.co.uk/news/archive/2014-07/09/soofa> on Nov. 3, 2014, Jul. 9, 2014, 4 pages.

Dong, et al.,' "Self-Constructive High-Rate System Energy Modeling for Battery-Powered Mobile Systems", In Proceedings of the 9th international conference on Mobile systems, applications, and services, Jun. 28, 2011, 14 pages.

Fairley, "Software Looks at the Road Ahead to Boost Hybrid-Car Efficiency", Retrieved from <http://spectrum.ieee.org/transportation/systems/software-looks-at-the-road-ahead-to-boost-hybridcar-efficiency> on Nov. 11, 2014, Feb. 3, 2009, 1 page.

Flinn, et al.,' "Energy-Aware Adaptation for Mobile Applications", In Proceedings of the Seventeenth ACM Symposium on Operating Systems Principles, Dec. 1999, pp. 48-63.

Fox, et al.,' "Automatic Construction of Efficient Multiple Battery Usage Policies", In Proceedings of the Twenty-Second International Joint Conference on Artificial Intelligence, Jun. 11, 2011, 6 pages.

Freund, et al.,' "Unsupervised Learning of Distributions on Binary Vectors Using Two Layer Networks", Baskin Center for Computer Engineering & Information Sciences, University of California, Santa Cruz, UCSC-CRL-94-25, Jun. 22, 1994, 41 pages.

Gonder, "Route-Based Control of Hybrid Electric Vehicles", In SAE Technical Paper, Apr. 14, 2008, 11 pages.

Gong, "Trip Based Optimal Power Management of Plug-in Hybrid Electric Vehicle with Advanced Traffic Modeling", In SAE International Journal of Engines, Apr. 14, 2008, 1 page.

Gong, "Trip Based Optimal Power Management of Plug-in Hybrid Electric Vehicles Using Gas-Kinetic Traffic Flow Model", In Proceedings of American Control Conference, Jun. 11, 2008, 6 pages.

Groiβ, "The Influence of Temperature on the Operation of Batteries and Other Electrochemical Energy Storage Systems", Retrieved from <http://www.basytec.de/Literatur/temperature/DE_2002.htm> on Nov. 3, 2014, Jan. 8, 2003, 7 pages.

Gu, et al.,' "Thermal-Electrochemical Modeling of Battery Systems", In Journal of Electrochemical Society, Jan. 28, 2000, 41 pages.

Hayakawa, et al.,' "Incentive Based Multi-Objective Optimization in Electric Vehicle Navigation including Battery Charging", In Proceedings of the International Federation of Automatic Control, Aug. 24, 2014, 7 pages.

He, "Vehicle-Infrastructure Integration-Enabled Plug-in Hybrid Electric Vehicles for Optimizing Energy Consumption", In Transportation Research Board 90th Annual Meeting Compendium of Papers DVD, Jan. 23, 2011, 14 pages.

Heath, et al.,' "Code Transformations for Energy Efficient Device Management", In Journal of IEEE Transactions on Computers, vol. 53, Issue 8, Aug. 2004, 37 pages.

Hinton, et al.,' "A Fast Learning Algorithm for Deep Belief Nets", Retrieved from <<http://www.cs. toronto.edu/-hinton/absps/fastnc.pdf>> on Jun. 19, 2009, 2006, 16 pages.

Johnson, et al.,' "Temperature Dependent Battery Models for High-Power Lithium-Ion Batteries", In 17th Annual Electric Vehicle Symposium, Oct. 15, 2000, 17 pages.

Jongerden, et al.,' "Maximizing System Lifetime by Battery Scheduling", In Proceeding of the IEEE/IFIP International Conference on Dependable Systems & Networks, Jun. 29, 2009, 10 pages.

Katsargyri, et al.,' "Optimally Controlling Hybrid Electric Vehicles using Path Forecasting", In Proceedings of American Control Conference, Jun. 10, 2009, 6 pages.

Keshav, et al.,' "Energy efficient scheduling in 4G smart phones for Mobile Hotspot Application", In Proceedings: National Conference on Communications, Feb. 3, 2012, 5 Pages.

Kohli, et al.,' "Robust Higher Order Potentials for Enforcing Label Consistency", Retrieved from <<http://research. microsoft.com/en-us/um/people/pkohli/papers/klt_cvpr08. pdf>> on Jun. 19, 2009, 8 pages.

Koushanfar, "Hybrid Heterogeneous Energy Supply Networks", In IEEE International Symposium on Circuits and Systems, May 15, 2011, 4 pages.

Krumm, "Where Will They Turn: Predicting Turn Proportions at Intersections", In Journal of Personal and Ubiquitous Computing, vol. 14, Issue 7, Oct. 2010, 14 pages.

Krumm, et al.,' "Predestination: Inferring Destinations from Partial Trajectories", UbiComp 2006: The Eighth International Conference on Ubiquitous Computing, Sep. 17-21, 2006, Orange County, CA, retrieved from <http://research.microsoft.com/en-us/um/people/horvitzlpredestination.pdf> on Feb. 5, 2009,Sep. 17, 2006, 18 pages.

Krumm, et al.,' "Predestination: Where Do You Want to Go Today?", In Journal of Computer, vol. 40, Issue 4, Apr. 2007, 4 pages.

Kumar, et al.,' "Discriminative Random Fields", International Journal of Computer Vision 68(2), 179-201, 2006, 23 pages.

Laasonen, et al.,' "Adaptive On-Device Location Recognition", In Proceedings of the 2nd International Conference on Pervasive Computing, Researchers and Practitioners, Apr. 2004, pp. 287-304.

Lamarca, et al.,' "Place Lab: Device Positioning Using Radio Beacons in the Wild", In Proceedings of Pervasive 2005, Munich, Germany, retrieved from <http://www.placelab.org/publications/pubs/pervasive-placelab-2005-final.pdf> on Feb. 5, 2009,May 2005, 18 pages.

Langari, et al.,' "Intelligent Energy Management Agent for a Parallel Hybrid Vehicle—Part I: System Architecture and Design of the Driving Situation Identification Process", In IEEE Transaction on Vehicular Technology, vol. 54, Issue 3, May 23, 2005, 10 pages.

Larochelle, et al.,' "An Empirical Evaluation of Deep Architectures on Problems with Many Factors of Variation", University of Montreal, CIAR Summer School, Aug. 9, 2007, 24 pages.

(56) References Cited

OTHER PUBLICATIONS

Lee, et al.,' "Sparse Deep Belief Net Model for Visual Area V2", Computer Science Department, Stanford University, Retrieved from <<http://books.nips.cc/papers/files/nips20/NIPS2007_0934.pdf>> on Jun. 19, 2009, 8 pages.

Lu, et al.,' "A Scalable and Programmable Architecture for the Continuous Restricted Boltzmann Machine in VLSI", The Department of Electrical Engineering, The National Tsing-Hua University, Taiwan, IEEE, 2007, pp. 1297-1300, 2007, 4 pages.

Mak, et al.,' "Infrastructure Planning for Electric Vehicles with Battery Swapping", In Journal of Academic Science, vol. 59, Issue 7, Jul. 2013, 33 pages.

Man, et al.," "Towards a Hybrid Approach to SoC Estimation for a Smart Battery Management System (BMS) and Battery Supported Cyber-Physical Systems (CPS)", In Proceeding of the 2nd Baltic Congress on Future Internet Communications, Apr. 25, 2012, 4 pages.

Mandal, "IntellBatt: Towards Smarter Battery Design", In Proceedings of 45th ACM/IEEE Design Automation Conference, Jun. 8, 2008, 6 pages.

MIT "Reality Commons", Retrieved from <http://realitycommons.media.mit.edu/> on Nov. 3, 2014, 2014, 2 pages.

Musardo, "A-ECMS: An Adaptive Algorithm for Hybrid Electric Vehicle Energy Management", In Proceedings of the 44th IEEE Conference on Decision and Control, and the European Control Conference, Dec. 12, 2005, 8 pages.

Osindero, et al.,' "Modeling Image Patches with a Directed Hierarchy of Markov Random Fields", Retrieved from <<http://www.cs.toronto.edu/-hinton/absps/lateral.pdf>> on Jun. 19, 2009, 8 pages.

Panigrahi, et al.,' "Battery Life Estimation of Mobile Embedded Systems", In Proceeding of the Fourteenth International Conference on VLSI Design, Jan. 2001, 7 pages.

Prigg, "Charged in 30 seconds: Israeli Firm Claims Battery Breakthrough that could Change the way we Power Phones and Laptops", Retrieved from <http://www.dailymail.co.uk/sciencetech/article-2599243/Charged-30-seconds-Israeli-firm-claims-battery-breakthrough-change-way-charge-phones-laptops.html> on Nov. 3, 2014, Apr. 7, 2014, 6 pages.

Ranzato, et al.,' "Space Feature Learning for Deep Belief Networks", Retrieved from <<http://yann.lecun.com/exdb/publis/pdf/ranzato-nips-07 .pdf>> on Jun. 19, 2009, 8 pages.

Rao, et al.,' "Analysis of Discharge Techniques for Multiple Battery Systems", In Proceedings of the International Symposium on Low Power Electronics and Design, Aug. 25, 2003, pp. 44-47.

Rao, et al.,' "Battery Modeling for Energy-Aware System Design", In Journal of Computer, vol. 36, Issue 12, Dec. 2012, 11 pages.

Ravi, et al.,' "Context-aware Battery Management for Mobile Phones: A Feasibility Study", In Proceedings of IEEE International Conference on Pervasive Computing and Communications, 2006, 16 pages.

Ravi, et al.,' "Context-aware Battery Management for Mobile Phones", Proceedings of the Sixth Annual IEEE International Conference on Pervasive Computing and Communications (PERCOM), Retrieved at <<http://www.cs.rutgers.edu/discolab/smartphone/papers/percom08.pdf>>,2008, 10 Pages.

Richard, "Google's Prediction API Could Optimize Your Car's Fuel Efficiency", Retrieved from <http://www.treehugger.com/cars/googles-prediction-api-could-optimize-your-cars-fuel-efficiency.html> on Nov. 11, 2014, May 18, 2011, 3 pages.

Rong, et al.,' "An Analytical Model for Predicting the Remaining Battery Capacity Prediction for Lithium-Ion Batteries", In Proceedings of the conference on Design, Automation and Test in Europe—vol. 1, Mar. 2003, 2 pages.

Ross, et al.,' "A Systematic Approach to Learning Object Segmentation from Motion", MIT Computer Science and AI Laboratory, Retrieved from <<http://web.mit.edu/mgross/www/publications/mgrlpk-cvw-paper-03.pdf>> on Jun. 19, 2009, 8 pages.

Roth, et al.,' "Fields of Experts: A Framework for Learning Image Priors", IEEE, Retrieved from <<http://ieeexplore.ieee.org/stamp/stamp.jsp?tp=&isnumber=31473&arnumber=1467533>> on Jun. 19, 2009, 8 pages.

Sachenbacher, et al.,' "Modeling and Optimization for Efficient Electrical Mobility: Challenges from the E-Tour Project", In Proceedings of First International Workshop on Constraint Reasoning and Optimization for Computational Sustainability, Sep. 20, 2009, 2 pages.

Sathiyanarayanan, "Maximization Battery Lifetime and Improving Efficiency", In Proceedings of International Conference on Devices, Circuits and Systems, Mar. 15, 2012, 4 pages.

Shotton, et al.,' "Semantic Texton Forests for Image Categorization and Segmentation", IEEE, Retrieved from <<http://ieeexplore.ieee.org/stamp/stamp.jsp?tp=&arnumber=4587503&isnumber=4587335>> on Jun. 19, 2009, 2008, 8 pages.

Shotton, et al.,' "TextonBoost for Image Understanding: Multi-Class Object Recognition and Segmentation by Jointly Modeling Texture, Layout, and Context", Retrieved from <<http://johnwinn.org/Publications/papers/TextonBoost_IJCV2009.pdf>> on Jun. 19, 2009, Jul. 2, 2007, 30 pages.

Simpson, "Characteristics of Rechargeable Batteries", In Literature No. SNVA533, 2011, 12 pages.

Smolensky, "Information Processing in Dynamical Systems: Foundations of Harmony Theory", CU-CS-321-86, University of Colorado at Boulder, Department of Computer Science, Retrieved from, Feb. 1986, 55 pages.

Strommer, et al.,' "NFC-enabled Wireless Charging", In Proceedings of the 4th International Workshop on Near Field Communication, Mar. 13, 2012, 6 pages.

Styler, "Active Management of a Heterogeneous Energy Store for Electric Vehicles", In IEEE Forum on Integrated and Sustainable Transportation System, Jun. 29, 2011, 6 pages.

Tieleman, "Training Restricted Boltzmann Machines Using Approximations to the Likelihood Gradient", Proceedings of the 25th International Conference on Machine Learning, pp. 1064-1071, 2008, 8 pages.

Tu, et al.,' "Image Parsing: Unifying Segmentation, Detection, and Recognition", Proceedings of the Ninth IEEE International Conference on Computer Vision (ICCV 2003) 2-Volume Set, 2003, 8 pages.

Tu, et al.,' "Image Segmentation by Data-Driven Markov Chain Monte Carlo", IEEE Transactions on Pattern Analysis and Machine Intelligence, vol. 24, No. 5, pp. 657-673, May 2002, 17 pages.

Wagner, "Microsoft Planning 7-Day Phone Batteries", Retrieved from <http://www.lightreading.com/mobile/devices-smartphones/microsoft-planning-7-day-phone-batteries/d/d-id/709382> on Nov. 11, 2014, Jun. 10, 2014, 4 pages.

Wang, "Reducing Power Consumption for Mobile Platforms via Adaptive Traffic Coalescing", In IEEE Journal on Selected Areas in Communications, vol. 29, Issue 8, Sep. 2011, pp. 1618-1629.

Wen, et al.,' "Online prediction of Battery Lifetime for Embedded and Mobile Devices", In Proceedings of the Third International Conference on Power-Aware Computer Systems, Dec. 1, 2003, 15 pages.

Wu, et al.,' "An Interleaved Dual-Battery Power Supply for Battery-Operated Electronics", In Proceedings of the Asia and South Pacific Design Automation Conference, Jan. 28, 2001, pp. 387-390.

Xu, et al.,' "V-edge: Fast Self-constructive Power Modeling of Smartphones Based on Battery Voltage Dynamics", In Proceedings of the 10th USENIX conference on Networked Systems Design and Implementation, Apr. 2, 2013, 24 pages.

Zeng, et al.,' "ECOSystem: Managing Energy as a First Class Operating System Resource", In Proceedings of ASPLOS 2002, Available at <http://www.cs.duke.edu/~vahdat/ps/ecosystem.pdf>,Oct. 2002, 10 pages.

Zhang, et al.,' "Abstract—Cooperation Behavior between Heterogeneous Cations in Hybrid Batteries", In Journal of Chemical Communications, Issue 85, Aug. 22, 2013, 4 pages.

Zhang, et al.,' "Modeling Discharge Behavior of Multicell Battery", In Proceeding of the IEEE Transactions on Energy Conversion, vol. 25, Issue 4, Dec. 2010, pp. 1133-1141.

(56) References Cited

OTHER PUBLICATIONS

Zheng, et al.,' "Enhancing Battery Efficiency for Pervasive Health-Monitoring Systems Based on Electronic Textiles", In Proceedings of IEEE Transactions on Information Technology in Biomedicine, vol. 14, No. 2, Nov. 3, 2009, 10 pages.
Zhu, et al.,' "A Stochastic Grammar of Images", Foundations and Trends in Computer Graphics and Vision, vol. 2, No. 4, pp. 259-362, 2006, 104 pages.
"International Search Report and Written Opinion", Application No. PCT/US2016/016670, Sep. 14, 2016, 23 pages.
"International Search Report and Written Opinion", Application No. PCT/US2016/016669, Sep. 30, 2016, 24 pages.
"Non-Final Office Action", U.S. Appl. No. 14/617,719, Aug. 22, 2016, 9 pages.
"Non-Final Office Action", U.S. Appl. No. 14/617,751, Aug. 25, 2016, 10 pages.
"Non-Final Office Action", U.S. Appl. No. 14/885,858, Oct. 7, 2016, 18 pages.
"Second Written Opinion", Application No. PCT/US2016/015493, Jul. 28, 2016, 5 pages.
"Second Written Opinion", Application No. PCT/US2016/016037, Sep. 1, 2016, 5 pages.
"Second Written Opinion", Application No. PCT/US2015/026052, Mar. 29, 2016, 6 pages.
"International Search Report and Written Opinion", Application No. PCT/US2016/016037, Apr. 8, 2016, 10 pages.
"International Search Report and Written Opinion", Application No. PCT/US2016/016033, May 9, 2016, 10 pages.
"International Search Report and Written Opinion", Application No. PCT/US2016/016671, May 11, 2016, 10 pages.
"International Search Report and Written Opinion", Application No. PCT/US2016/015493, Apr. 4, 2016, 11 pages.
"International Search Report and Written Opinion", Application No. PCT/US2016/016034, Apr. 14, 2016, 16 pages.
"Final Office Action", U.S. Appl. No. 13/530,130, Apr. 22, 2015, 7 pages.
"Non-Final Office Action", U.S. Appl. No. 12/503,605, Jan. 12, 2012, 11 pages.
"Non-Final Office Action", U.S. Appl. No. 12/503,605, Oct. 4, 2013, 14 pages.
"Non-Final Office Action", U.S. Appl. No. 13/530,130, Oct. 3, 2014, 8 pages.
"International Search Report and Written Opinion", Application No. PCT/US2015/026052, Jul. 23, 2015, 10 pages.
"Notice of Allowance", U.S. Appl. No. 13/530,130, Nov. 6, 2015, 5 pages.
"Anker", Retrieved on: Aug. 13, 2015—Available at: http://www.ianker.com/ExternalBatteries/category-c1-s1 , 9 pages.
"Arbin BT-2000 Battery Testing Equipment", Retrieved on: Aug. 13, 2015—Available at: http://www.arbin.com/products/battery, 2 pages.
"Battery and Power Subsystem Hardware Design", Retrieved From: <https://msdn.microsoft.com/en-us/library/windows/hardware/dn481323(v=vs.85).aspx> Aug. 5, 2015, Jun. 30, 2014, 4 pages.
"Battery Anodes", Retrieved on Sep. 23, 2015 Available at: http://www.emc2.cornell.edu/content/view/battery-anodes.html, 8 pages.
"DS2782 Stand-Alone Fuel Gauge IC", Retrieved From: <http://www.maximintegrated.com/en/products/power/battery-management/DS2782.html/tb_tab0> Aug. 6, 2015, 3 pages.
"Google Now", Retrieved on: Aug. 13, 2015—Available at: http://www.google.com/landing/now/, 1 page.
"Hey Siri, what's the Best Sushi Place in Town?", Retrieved on: Aug. 13, 2015—Available at: https://www.apple.com/ios/siri/, 5 pages.
"iFixit iPad Air 2 Teardown", Retrieved on: Aug. 13, 2015—Available at: https://www.ifixit.com/Teardown/iPad+Air+2+Teardown/30592, 12 pages.
"iFixit Microsoft Surface Pro 3 Teardown", Retrieved on: Aug. 13, 2015—Available at: https://www.ifixit.com/Teardown/Microsoft+Surface+Pro+3+Teardown/26595, 17 pages.

"iFixit Samsung Galaxy Note 10.1 Teardown", Retrieved on: Aug. 13, 2015—Available at: https://www.ifixit.com/Teardown/Samsung+Galaxy+Note+10.1+Teardown/10144, 13 pages.
"MacBook", Retrieved on: Aug. 13, 2015—Available at: http://www.apple.com/macbook/design/, 14 pages.
"MACCOR-Model 4200", Retrieved on: Aug. 13, 2015—Available at: http://www.maccor.com/Products/Model4200.aspx, 2 pages.
"Maxim-Parametric Search Product Table", Retrieved on: Aug. 13, 2015—Available at: http://para.maximintegrated.com/en/results.mvp?fam=batt_stat295=Fuel%26nbsp%3BGauge&1379=ModelGauge, 2 pages.
"Mophie Juice Pack Helium", Retrieved on: Aug. 13, 2015—Available at: http://www.mophie.com/shop/iphone-5/juice-pack-helium-iphone-5, 7 pages.
"Qualcomm Quick Charge", Retrieved on: Aug. 13, 2015—Available at: https://www.qualcomm.com/products/snapdragon/quick-charge, 9 pages.
"Surface Power Cover", Retrieved on: Aug. 13, 2015—Available at: http://www.microsoft.com/surface/en-us/support/hardware-and-drivers/power-cover?os=windows-10, 8 pages.
"Understanding Lithium-ion-Battery University", Retrieved on: Sep. 23, 2015 Available at: http://batteryuniversity.com/learn/article/understanding_lithium_ion, 8 pages.
Albertus,"Experiments on and Modeling of Positive Electrodes with Multiple Active Materials for Lithium-Ion Batteries", In Journal of the Electrochemical Society, vol. 156, Issue 7, May 14, 2009, 1 page.
Balasubramanian,"Energy Consumption in Mobile Phones: A Measurement Study and Implications for Network Applications", Proceedings of the 9th ACM SIGCOMM conference on Internet measurement conference (IMC), Retrieved at <<http://www.cs.umass.edu/-arunab/paper/tailender-imc09.pdf>>, Nov. 4, 2009, 14 Pages.
Benini,"Scheduling Battery Usage in Mobile Systems", In IEEE Transactions on Very Large Scale Integration Systems, vol. 11, Issue 6, Dec. 2003, pp. 1136-1143.
Bickford,"Security versus Energy Tradeoffs in Host-Based Mobile Malware Detection", In Proceedings of 9th International Conference on Mobile Systems, Applications, and Services, Jun. 28, 2011, pp. 225-238.
Borkar,"Intel Look Inside", Available at: http://www.intel.com/content/dam/www/public/us/en/documents/presentation/advancing-moores-law-in-2014-presentation.pdf, Aug. 11, 2014, 68 pages.
Carroll,"An Analysis of Power Consumption in a Smartphone", In Proceedings of USENIX Annual Technical Conference, Jun. 23, 2010, 14 pages.
Chiasserini,"Energy Efficient Battery Management", In IEEE Journal on Selected Areas in Communications, vol. 19, Issue 7, Jul. 2001, pp. 1235-1245.
Chikkannanavara,"A Review of Blended Cathode Materials for Use in Li-Ion Batteries", In Journal of Power Sources, vol. 248, Feb. 15, 2015, 2 Pages.
Clark,"New Tech Allows Lithium Batteries to Charge Faster, and Hold Charge Longer", Available at: http://www.gizmag.com/lithium-batteries-charge-faster-hold-longer/20550/, Oct. 20, 2015, 8 pages.
Cosby,"Multiple battery chemistries, single device!", Retrieved From: <https://e2e.ti.com/blogs_/b/fullycharged/archive/2015/06/16/multiple-battery-chemistries-single-device> Aug. 6, 2015, Jun. 16, 2015, 3 pages.
Erdinc,"A Dynamic Lithium-Ion Battery Model considering the Effects of Temperature and Capacity Fading", In Proceedings of International Conference on Clean Electrical Power, 060/9/2009, pp. 383-386.
Flinn,"Managing Battery Lifetime with Energy-Aware Adaptation", In Journal of ACM Transactions on Computer Systems, vol. 22, Issue 2, May 2004, 43 pages.
Fonseca,"Quanto: Tracking Energy in Networked Embedded Systems", In Proceedings of 8th USENIX Conference on Operating Systems Design and Implementation, Dec. 8, 2008, 16 pages.
Gao,"Dynamic Lithium-Ion Battery Model for System Simulation", In Journal of IEEE Transactions on Components and Packaging Technologies, vol. 25, No. 3, Sep. 2002, pp. 495-505.

(56) References Cited

OTHER PUBLICATIONS

He,"State-of-Charge Estimation of the Lithium-Ion Battery Using an Adaptive Extended Kalman Filter Based on an Improved Thevenin Model", In Proceedings of IEEE Transactions on Vehicular Technology, vol. 60, Issue 4, May 2011, pp. 1461-1469.

Higgins,"Informed Mobile Prefetching", In Proceedings of the 10th international conference on Mobile systems, applications, and services, Jun. 25, 2012, pp. 155-168.

Jongerden,"Lifetime Improvement by Battery Scheduling", In Proceedings of the 16th international GI/ITG conference on Measurement, Modelling, and Evaluation of Computing Systems and Dependability and Fault Tolerance, Mar. 19, 2012, 15 pages.

Korhonen,"Predicting Mobile Device Battery Life", In Master's Thesis, Feb. 28, 2011, 62 pages.

Miettinen,"Energy Efficiency of Mobile Clients in Cloud Computing", In Proceedings of the 2nd USENIX conference on Hot topics in cloud computing, Jun. 22, 2010, 7 pages.

Miliche,"A First Experimental Investigation of the Practical Efficiency of Battery Scheduling", In Proceedings of 23th International Conference on Architecture of Computing Systems,, Feb. 22, 2010, 6 pages.

Mittal,"Empowering Developers to Estimate App Energy Consumption", In Proceedings of the 18th annual international conference on Mobile computing and networking, Aug. 22, 2012, pp. 317-328.

Pathak,"Fine-Grained Power Modeling for Smartphones using System Call Tracing", In Proceedings of the sixth conference on Computer systems, Apr. 10, 2011, pp. 153-168.

Pathak,"Where is the Energy Spent Inside My App? Fine Grained Energy Accounting on Smartphones with Eprof", In Proceedings of the 7th ACM European conference on Computer Systems, Apr. 10, 2012, pp. 29-42.

Qian,"Profiling Resource Usage for Mobile Applications: A Crosslayer Approach", In Proceedings of the 9th international conference on Mobile systems, applications, and services, Jun. 28, 2011, 14 pages.

Roy,"Energy Management in Mobile Devices with Cinder Operating System", In Proceedings of the sixth conference on Computer systems, Apr. 10, 2011, pp. 139-152.

Shanklin,"Samsung Gear Live vs. Gear 2", Available at: http://www.gizmag.com/samsung-gear-live-vs-gear-2-smartwatch-comparison/32775/, Jul. 1, 2014, 17 pages.

Shye,"Into the wild: Studying real user activity patterns to guide power optimizations for mobile architectures", In Proceedings of 42nd Annual IEEE/ACM International Symposium on Microarchitecture,, Dec. 12, 2009, pp. 168-178.

Srinivasan,"This week in batteries (TWiB)", Available at: http://thisweekinbatteries.blogspot.in/2010_06_01_archive.html, Jun. 28, 2015, 4 pages.

Styler,"Active Management of a Heterogeneous Energy Store for Electric Vehicles", Retrieved from: <http://repository.cmu.edu/cgi/viewcontent.cgi?article=1845&context=robotics> on Jun. 29, 2011, 8 Pages.

Thiagarajan,"Who Killed My Battery: Analyzing Mobile Browser Energy Consumption", In Proceedings of the 21st international conference on World Wide Web, Apr. 16, 2012, pp. 41-50.

Viswanathan,"Effect of Entropy Change of Lithium Intercalation on Cathodes and Anodes on Li-ion Battery Thermal Management", In Journal of Power Sources, vol. 195, Issue 11, Jun. 1, 2010, pp. 3720-3729.

Xu,"Optimizing Background Email Sync on Smartphones", In Proceeding of the 11th Annual International Conference on Mobile Systems, Applications, and Services, Jun. 25, 2013, pp. 55-68.

Yoon,"App-Scope: Application Energy Metering Framework for Android Smartphones using Kernel Activity Monitoring", In Proceedings of the USENIX conference on Annual Technical Conference, Jun. 15, 2012, 14 pages.

Zhang,"Accurate Online Power Estimation and Automatic Battery Behavior Based Power Model Generation for Smartphones", In Proceedings of the eighth IEEE/ACM/IFIP international conference on Hardware/software codesign and system synthesis, Oct. 24, 2010,, Oct. 24, 2010, pp. 105-114.

"Final Office Action", U.S. Appl. No. 14/617,719, Dec. 12, 2016, 10 pages.

"International Preliminary Report on Patentability", Application No. PCT/US2016/016671, Feb. 22, 2017, 6 pages.

"International Preliminary Report on Patentability", Application No. PCT/US2016/016033, Nov. 7, 2016, 6 pages.

"International Preliminary Report on Patentability", Application No. PCT/US2016/016037, Nov. 24, 2016, 6 pages.

"International Preliminary Report on Patentability", Application No. PCT/US2015/026052, Jul. 27, 2016, 8 pages.

"International Search Report and Written Opinion", Application No. PCT/US2016/055238, Jan. 19, 2017, 11 pages.

"Non-Final Office Action", U.S. Appl. No. 14/262,205, Dec. 23, 2016, 6 pages.

"Non-Final Office Action", U.S. Appl. No. 14/624,825, Nov. 18, 2016, 33 pages.

"Non-Final Office Action", U.S. Appl. No. 14/626,600, Feb. 13, 2017, 27 pages.

"Non-Final Office Action", U.S. Appl. No. 14/943,967, Jan. 3, 2017, 11 pages.

"Notice of Allowance", U.S. Appl. No. 14/617,719, Mar. 1, 2017, 5 pages.

"Restriction Requirement", U.S. Appl. No. 14/624,808, Feb. 23, 2017, 6 pages.

"Second Written Opinion", Application No. PCT/US2016/016034, Jan. 17, 2017, 8 pages.

"Second Written Opinion", Application No. PCT/US2016/016670, Nov. 18, 2016, 6 pages.

"Final Office Action", U.S. Appl. No. 14/617,751, dated Mar. 10, 2017, 11 pages.

"International Preliminary Report on Patentability", Application No. PCT/US2016/015493, dated Apr. 21, 2017, 6 pages.

"International Search Report and Written Opinion", Application No. PCT/US2016/063741, dated Mar. 22, 2017, 13 pages.

"International Search Report and Written Opinion", Application No. PCT/US2016/060415, dated Feb. 22, 2017, 16 pages.

"Non-Final Office Action", U.S. Appl. No. 14/626,518, dated Mar. 27, 2017, 24 pages.

"Non-Final Office Action", U.S. Appl. No. 14/941,416, dated May 17, 2017, 13 pages.

"Non-Final Office Action", U.S. Appl. No. 14/959,265, dated Apr. 21, 2017, 8 pages.

"Non-Final Office Action", U.S. Appl. No. 14/617,751, dated Jun. 30, 2017, 11 pages.

"Corrected Notice of Allowance", U.S. Appl. No. 14/617,719, dated May 30, 2017, 2 pages.

"Corrected Notice of Allowance", U.S. Appl. No. 14/617,719, dated Jun. 8, 2017, 2 pages.

"Final Office Action", U.S. Appl. No. 14/885,858, dated Jun. 9, 2017, 22 pages.

"Non-Final Office Action", U.S. Appl. No. 14/624,808, dated May 23, 2017, 5 pages.

"Notice of Allowance", U.S. Appl. No. 14/262,205, dated May 31, 2017, 5 pages.

"Notice of Allowance", U.S. Appl. No. 14/959,265, dated Jun. 29, 2017, 5 pages.

"International Preliminary Report on Patentability", Application No. PCT/US2016/016670, dated May 12, 2017, 7 pages.

\* cited by examiner

LOAD ALLOCATION FOR MULTI-BATTERY DEVICES

BACKGROUND

This background is provided for the purpose of generally presenting a context for the instant disclosure. Unless otherwise indicated herein, material described in the background is neither expressly nor impliedly admitted to be prior art to the instant disclosure or the claims that follow.

Batteries are often used as a power source for mobile computing and electronic devices, such as wearable devices, smart phones, tablets, and the like. Typically, a lifetime of the mobile device is determined by an amount of energy provided by the device's batteries. The amount of energy provided by the batteries, however, is often less than a total amount of energy stored by the batteries. Because of inefficiencies within the batteries and other power circuitry, at least some of the batteries' total energy is lost instead of being provided to the device. In many cases, an extent to which these inefficiencies effect the batteries' ability to provide energy depend on the batteries' condition and ways in which power is drawn from the batteries.

For example, an internal resistance of a battery often increases as the battery's charge level declines or the battery ages. This increase of internal resistance results in additional internal energy loss as power is drawn from the battery, effectively reducing the amount of useful energy provided to the device. In some cases, such as when large amounts of power are drawn from the battery over short periods of time, these internal energy losses can substantially impact the amount of useful energy provided to the device and thus substantially deteriorate battery lifetime.

SUMMARY

This document describes techniques and apparatuses for load allocation in multi-battery devices. That is, given a device that can be powered with multiple batteries, a load allocation may specify from which of the multiple batteries power is drawn at any given time to power the device. Further, the load allocation may also specify respective amounts of power that are drawn from a subset or all of the device's multiple batteries. In at least some cases, a device's load power is allocated to multiple batteries of the device based on respective efficiencies at which the multiple batteries can provide power. By so doing, overall energy consumption of the device can be reduced, which can prolong the device's lifetime.

In some embodiments, an amount of load power being consumed by a device operate is determined. Respective efficiencies at which batteries of the device are capable of providing power are also determined. An allocation of the load power to the batteries is then determined based on their respective efficiencies to maximize an efficiency at which the batteries collectively power the device. Portions of the load power required by the device are drawn from (e.g., served by) each of the batteries in accordance with the determined allocation.

In other embodiments, a current amount of load power being consumed by a device is determined. An expected amount of load power that the device will consume at a future point in time is also estimated. Respective efficiencies at which the device's batteries are capable of providing power are determined. An allocation for the load power among the multiple batteries is then determined based on the current and expected amounts of load power and these respective efficiencies. This allocation can be effective to maximize an efficiency at which the multiple batteries power the device until the future point in time. Portions of the load power required by the device are drawn from (e.g., served by) each of the batteries in accordance with the determined allocation.

This summary is provided to introduce simplified concepts that are further described below in the Detailed Description. This summary is not intended to identify essential features of the claimed subject matter, nor is it intended for use in determining the scope of the claimed subject matter. Techniques and/or apparatuses of load allocation for multi-battery devices are also referred to herein separately or in conjunction as the "techniques" as permitted by the context, though techniques may include or instead represent other aspects described herein.

BRIEF DESCRIPTION OF THE DRAWINGS

Embodiments enabling load allocation for multi-battery devices are described with reference to the following drawings. The same numbers are used throughout the drawings to reference like features and components.

DETAILED DESCRIPTION

Overview

Mobile devices often draw power from multiple batteries in order to operate. Typically, these batteries are configured in a monolithic or static topology in which power is drawn from all of the device's batteries until the batteries reach an end of their discharge. Monolithic or static battery topologies, however, often limit battery selection to batteries that have similar operating characteristics (e.g., voltage profiles and capacities), such as a set of lithium-polymer cells. This precludes the use of other or multiple types of batteries that may offer various advantages, such as different physical or electrical characteristics. Additionally, because power is drawn from all the batteries via fixed circuitry, efficiency of the mobile device's energy usage is essentially limited to the electrical characteristics of a single type of battery.

This document describes techniques and apparatuses of load allocation for multi-battery devices. These apparatuses and techniques enable variable allocation of a device's load power to multiple batteries. In some cases, the allocation of the load power is determined based on respective efficiencies at which the multiple batteries are capable of providing power. By so doing, an efficiency at which the multiple batteries power the device can be maximized. Alternately or additionally, the allocation of the load power can enable the use of heterogeneous batteries, which have different physical or electrical characteristics. This may enable device designers to select multiple types of batteries to more-efficiently serve different workload types or profiles of the mobile device.

These are but a few examples of many ways in which the techniques enable load allocation for multi-battery devices, others of which are described below.

Example Operating Environment

Figure 1:
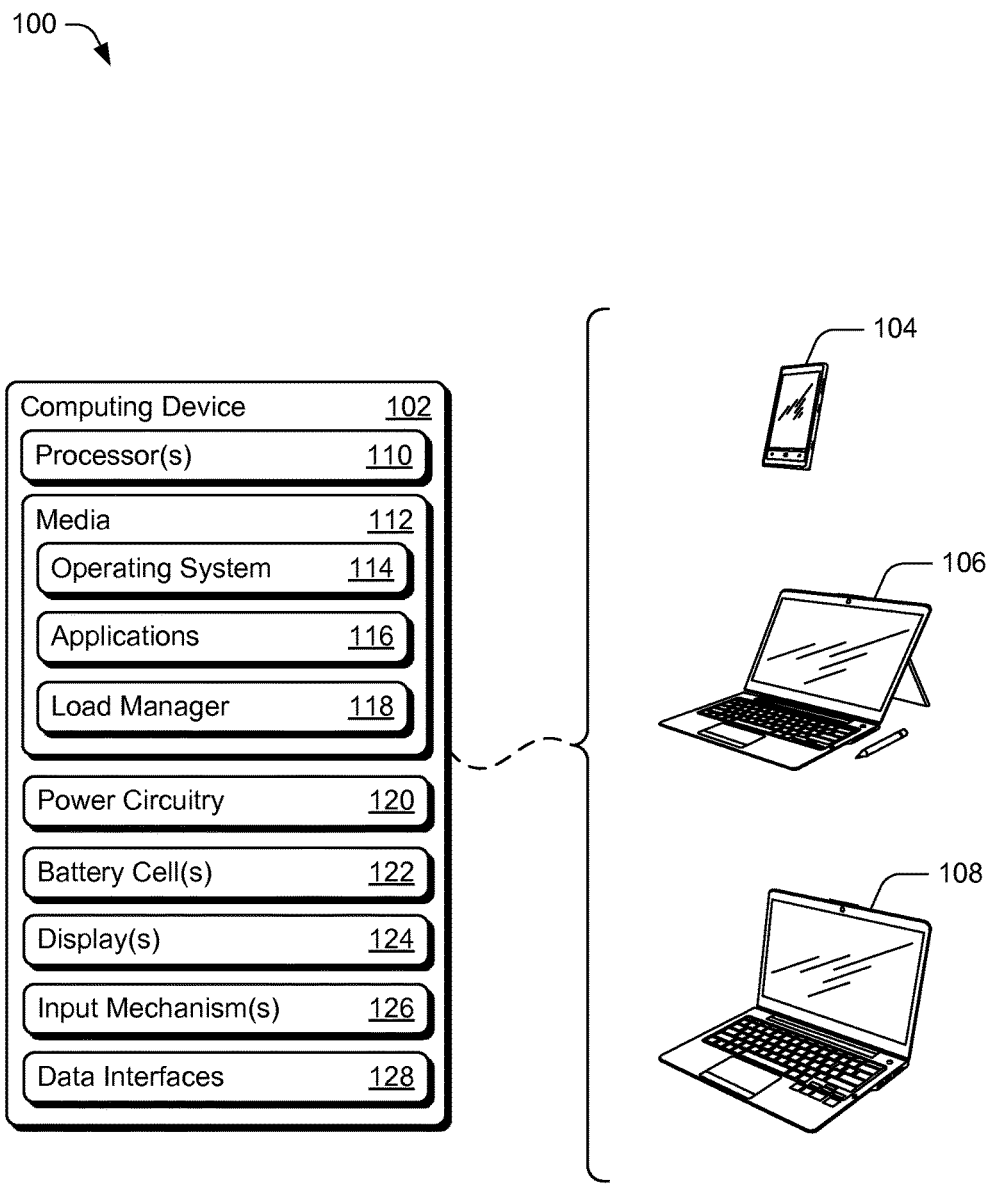
FIG. 1 illustrates an example environment in which techniques of load allocation for multi-battery devices can be implemented.

FIG. 1 illustrates an example operating environment 100 in which techniques of load allocation for multi-battery device can be implemented. Operating environment 100 includes a computing device 102, which is illustrated with three examples: a smart phone 104, a tablet computing device 106 (with optional keyboard), and a laptop computer 108, though other computing devices and systems, such as netbooks, health-monitoring devices, sensor nodes, smart watches, fitness accessories, Internet-of-Things (IoT) devices, wearable computing devices, media players, and personal navigation devices may also be used.

Computing device 102 includes computer processor(s) 110 and computer-readable storage media 112 (media 112). Media 112 includes an operating system 114 and applications 116, which enable various operations of computing device 102. Operating system 114 manages resources of computing device 102, such as processor 110, media 112, and the like (e.g., hardware subsystems). Applications 116 comprise tasks or threads that access the resources managed by operating system 114 to implement various operations of computing device 102. Media 112 also includes load manager 132, the implementation and use of which varies and is described in greater detail below.

Computing device 102 also power circuitry 120 and battery cell(s) 122, from which computing device 102 can draw power to operate. Generally, power circuitry 120 may include firmware or hardware configured to enable computing device 102 to draw operating power from battery cells 122 or to apply charging power to battery cells 122. Battery cells 122 may include any suitable number or type of rechargeable battery cells, such as lithium-ion (Lion), lithium-polymer (Li—Poly), lithium ceramic (Li—C), flexible printed circuit (FPC) Li—C, and the like. Implementations and uses of power circuitry 120 and battery cells 122 vary and are described in greater detail below.

Computing device 102 may also include display 124, input mechanisms 126, and data interfaces 128. Although shown integrated with the example devices of FIG. 1, display 124 may be implemented separate from computing device 102 via a wired or wireless display interface. Input mechanisms 126 may include gesture-sensitive sensors and devices, such as touch-based sensors and movement-tracking sensors (e.g., camera-based), buttons, touch pads, accelerometers, and microphones with accompanying voice recognition software, to name a few. In some cases, input mechanisms 126 are integrated with display 124, such an in a touch-sensitive display with integrated touch-sensitive or motion-sensitive sensors.

Data interfaces 128 include any suitable wired or wireless data interfaces that enable computing device 102 to communicate data with other devices or networks. Wired data interfaces may include serial or parallel communication interfaces, such as a universal serial bus (USB) and local-area-network (LAN). Wireless data interfaces may include transceivers or modules configured to communicate via infrastructure or peer-to-peer networks. One or more of these wireless data interfaces may be configured to communicate via near-field communication (NFC), a personal-area-network (PAN), a wireless local-area-network (WLAN), or wireless wide-area-network (WWAN). In some cases, operating system 114 or a communication manager (not shown) of computing device 102 selects a data interface for communications based on characteristics of an environment in which computing device 102 operates.

Figure 2:
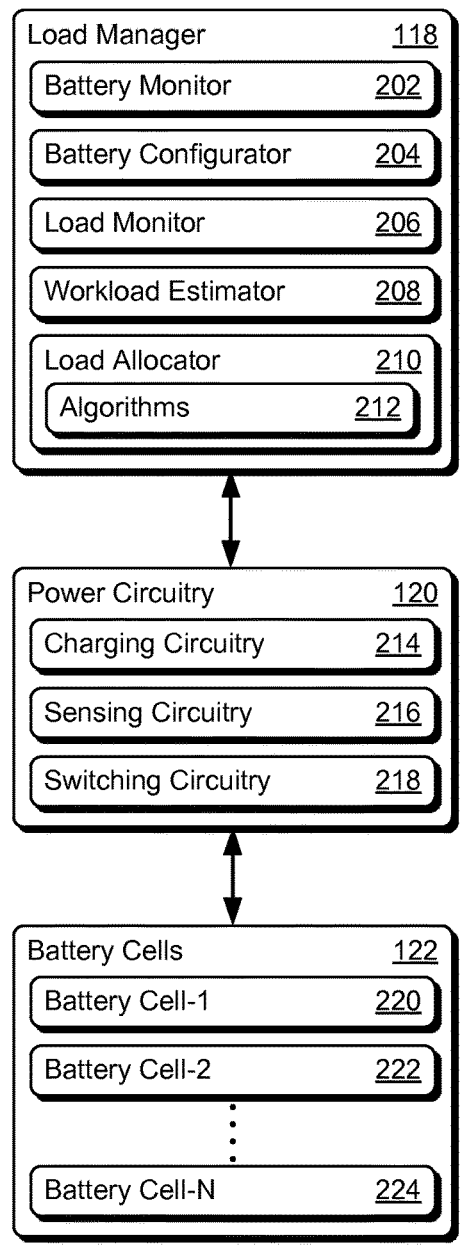
FIG. 2 illustrates an example battery system capable of implementing load allocation for multi-battery device.

FIG. 2 illustrates an example battery system 200 capable of implementing aspects of the techniques described herein. In this particular example, battery system 200 includes load manager 118, power circuitry 120, and battery cells 122. In some embodiments, load manager 118 is implemented in software (e.g., application programming interface) or firmware of a computing device by a processor executing processor-executable instructions. Alternately or additionally, components of load manager 118 can be implemented integral with other components of battery system 200, such as power circuitry 120 and battery cells 122 (individual or packaged).

Load manager 118 may include any or all of the entities shown in FIG. 2, which include battery monitor 202, battery configurator 204, load monitor 206, workload estimator 208, and load allocator 210. Battery monitor 202 is configured to monitor characteristics of battery cells 122, such as terminal voltage, current flow, state-of-charge (e.g., remaining capacity), temperature, age (e.g., time or charging cycles), and the like. In some cases, battery monitor 202 may calculate or determine the internal resistance of a battery cell based on any of the other characteristics, such as age, temperature, or state-of-charge.

Battery configurator 204 is configured to determine or access respective configuration information for battery cells 122, such as cell manufacturer, chemistry type, rated capacity, voltage and current limits (e.g., cutoffs), circuit topology, and the like. In some cases, the information of battery configurator 204 may also be useful in determining an internal resistance of a battery cell. Battery configurator 204 may store and enable other entities of load manager 118 to access this battery cell configuration information.

Load monitor 206 monitors an amount of load power consumed by computing device 102 to operate. Load monitor 206 may monitor a current amount of load power (e.g., instantaneous power consumption) or load power consumed over time, such as by Coulomb counting. This load power is typically the amount of power provided by, or drawn from, one or more of battery cells 122 to enable operations of computing device 102. In some cases, load monitor 206 monitors individual amounts of power drawn from each respective one of battery cells 122. Load monitor 206 may also monitor an amount of power applied to one or more of battery cells 122 by computing device 102 during charging.

Workload estimator 208 estimates an amount of power that computing device 102 may consume when performing various tasks or operations. In some cases, the amount of power is estimated over duration of time, for a future duration of time, or at a future point in time. The estimation of the power may be based on tasks (e.g., whether the screen is on (high power) or off (low power)) that computing device 102 is performing, scheduled to perform, likely to perform, and so on.

For example, workload estimator may receive information from operating system 114 that indicates a set of tasks are scheduled for execution by resources of computing device 102. Based on the set of tasks, workload estimator 208 estimates or forecasts an expected amount of current that computing device 102 will consume to perform the tasks. In some cases, workload estimator 208 provides a power consumption forecast over time based on a schedule (e.g., waking or sleep times) or predicted order of execution for the tasks.

Load allocator 210 is configured to determine allocations of computing device 102's load power to be served by battery cells 122. This allocation may define respective portions of the device's load power (e.g., total required operational power) that are distributed to each of battery cells 122. The device draws its required load power according to this distribution from the different battery cells; i.e., each battery cell serves its respective portion of the device's load power. In some cases, load allocator 210 determines a load allocation scheme based on information received from other entities of load manager 118, such as current and expected workloads of computing device 102, and respective characteristics (e.g., internal resistances) of battery cells 122. Based on this information, an allocation scheme may be configured to draw power from all or a subset of battery cells 122 to maximize an efficiency at which power is drawn from battery cells 122.

Generally, the efficiency at which power is drawn from battery cells 122 can be defined as a ratio of useful energy extracted from battery cells 122 to the total energy stored by battery cells 122. Ideally, all of the stored energy would be extracted from battery cells 122 as useful energy for consumption by computing device 102. At least some of the stored energy, however, is wasted or lost within battery cells 122 due to various factors, such as parasitic losses, temperature, or material breakdown. Accordingly, minimizing the wasted energy in each of battery cells 122 can be effective to maximize an overall efficiency at which power is drawn from all of battery cells 122.

Primary factors associated with the wasted energy of a battery include power of a load drawn from the battery and the internal resistance of the battery. Intrinsic to the nature of batteries, higher amounts of load power cause more energy waste within a battery, which in turn reduces an output of useful energy. An example of load power versus energy output is shown in Table 1, where load power is denoted in capacity C such that application of the load 1C will discharge the battery in approximately 1 hour (based on rated capacity).

TABLE 1

| Load Power | Discharge Time | Energy Output |
|---|---|---|
| 6 C | 5.3 minutes | 4.3 kilojoules |
| 4 C | 14.6 minutes | 8.2 kilojoules |
| 2 C | 33.2 minutes | 10.0 kilojoules |
| 1 C | 76.3 minutes | 10.7 kilojoules |

As indicated by the data of Table 1, useful energy output by the battery at 6C load power is much less than that of 1C load power. This difference is due to the increased level of wasted energy that occurs when the battery is subjected to the load power of 6C.

The internal resistance of the battery may also affect the amount of wasted energy under a given current level flowing through the battery. Quantitatively, simplifying the battery to an equivalent circuit of internal resistance and an ideal power source, the wasted energy can be modeled as the square of the current multiplied by the internal resistance over time. Thus, higher internal resistances cause greater amounts of wasted energy within the battery. Under fixed external circumstances, the internal resistance in turn depends on the battery's state-of-charge (SoC), the decrease of which causes an increase in the internal resistance. As such, when the battery's SoC decreases, more energy is wasted under a given load power level as the battery's internal resistance increases. Accordingly, load allocator 210 may consider a load power level or respective internal resistances of batteries when allocating workloads of computing device 102.

Load allocator 210 may also allocate the load power of computing device 102 based on load algorithms 212 (algorithms 212). Algorithms 212 may include general classes of allocation algorithms, such as scheduling algorithms and weighted algorithms. Scheduling algorithms include algorithms by which load power of computing device 102 is served, at any time, by one or multiple batteries. Alternately, weighted algorithms include algorithms by which load power of computing device 102 is served by all or a subset of multiple batteries. Either class of algorithm may provide a more-efficient allocation of the load power depending on a device workload or characteristics of the multiple batteries providing device power.

In some embodiments, scheduling algorithms include a sequential algorithm, least-internal-resistance algorithm (least-resistance algorithms), and threshold algorithm. The sequential algorithms allocate load power such that the load power is drawn sequentially from one battery after another. For example, one battery may be used until discharged completely, at which point power is drawn from a next battery. The least-resistance algorithm, which also may be referred to as a 'greedy' algorithm, allocates load power based on the instantaneous power level of a load and the instantaneous respective internal resistances of the batteries. Because drawing large amounts of power from batteries having high internal resistances is highly inefficient, the least-resistance algorithm allocates high power loads to the batteries that have the least internal resistance. Additionally, the least-resistance algorithm may allocate low power loads to batteries with higher internal resistances.

The threshold algorithm operates based on particular thresholds associated with batteries, such as thresholds for SoC or internal resistance. More specifically, the threshold algorithm may be implemented as a hybrid algorithm that implements aspects other algorithms based on thresholds. For example, a threshold algorithm may apply a sequential algorithm to multiple batteries until each battery reaches a particular threshold, such as 50% of state-of-charge. The threshold algorithm can then apply the least-resistance algorithm to allocate device load power to the partially discharged multiple batteries.

Weighted algorithms may include a parallel algorithm and variable-weight algorithm. These algorithms allocate load power or workload of computing device 102 to multiple batteries concurrently. The parallel algorithm allocates the load power to all of the multiple batteries, and may be implemented by connecting the batteries together in parallel. In most cases, however, parallel connection of the batteries limits application of the parallel algorithm to similar type batteries to prevent unintended inter-battery current flow (e.g., charging), which can damage the batteries.

Typically, allocations of the parallel algorithm minimize instantaneous waste energy or maximize instantaneous energy efficiency for multiple batteries. By way of example, consider a system having n batteries that each have a resistance $R_i$. The system load power, or load current I, is applied to each battery as $I_i$. The wasted energy of the system can be minimized as shown in Equation 1.

$$\min \Sigma I_i^2 R_i \text{ where } \Sigma I_i = I \qquad \text{Equation 1}$$

Applying a standard Lagrange-multiplier approach results in an optimal solution as shown in Equation 2.

$$I_i^* = \frac{1}{R_i} \cdot \left(\frac{-\lambda}{2}\right) \text{ where } \lambda \text{ is a negative constant value} \qquad \text{Equation 2}$$

Further defining voltage V as $-\lambda/2$ provides Equation 3, which is the result of the connecting multiple batteries in parallel to minimize instantaneous energy loss associated with resistances $R_i$.

$$I_i^* R_i = V \text{ for any current } i \qquad \text{Equation 3}$$

As noted above, however, the application of the parallel algorithm may be best suited for homogenous batteries to avoid unbalanced battery circuits or unintended charging between batteries of different states.

The variable-weight algorithm may allocate varying portions of load power to multiple batteries other than those subject to Equation 3. In some cases, the variable-weight algorithm is capable of allocating different amounts of load power to each of the multiple batteries. Because the variable-weight algorithm is capable of allocating specific load power to individual or subsets of multiple batteries, the load power can be drawn from heterogeneous batteries. Alternately or additionally, the variable-weight algorithm may allocate approximately equal portions of load power to heterogeneous batteries, such as by accounting for differences between the batteries.

In at least some embodiments, the variable-weight algorithm provides an optimal efficiency over time, particularly when workloads vary between low-power and high-power. In some cases, this includes allocating low-power loads into batteries having lower SoCs (higher internal resistance) to preserve efficiencies of other batteries having higher SoCs (lower internal resistances).

By way of example, consider a system having m batteries that will power two sequential workloads for a unit length of time. The initial resistances of the m batteries are $R_1$ through $R_m$, and the current of the loads are L and H. Letting $x_1$ through $x_m$ denote current intensity of low-power load L and $y_1$ through $y_m$ denote current intensity of high-power load H, the goal is to determine an allocation of $x_{1 \ldots m}$ and $y_{1 \ldots m}$ such that wasted energy of load H is minimized.

Further, assume linear SoC-internal resistance relationships (e.g., curves) for batteries m, such that if current intensity $x_i$ is drawn from battery i to power L, the resistance when powering H will be $R_i' = R_i + \delta_i \cdot x_i$, where $\delta_i$ of the internal resistance relationship is constant, but can vary between batteries. Assuming also that the internal resistances do not change when serving either load and that load allocation of $x_i$ and $y_i$ can be any real number as long as $\Sigma x_i = L$ and $\Sigma y_i = H$, the minimization can be expressed as Equation 4.

$$\min_{x,y} \Sigma y_i^2 R_i', \text{ where } \Sigma x_i = L, \Sigma y_i = H, R_i' = R_i + \delta_i x_i \qquad \text{Equation 4}$$

To solve the minimization, $z_i = 1/R_i' = 1/(R_i + \delta_i x_i)$ is defined as the conductivity of battery i powering load H. Based on the previous optimization of $y_i * R_i' = V$ for any i, for $z_i = 1/R_i'$ the optimal $y_i$ should be proportional to $z_i$ and sum to load H, which yields $$y_i^* = H \cdot \frac{z_i}{\Sigma_j z_j}.$$

This allows an objective function to be written as shown in Equation 5.

$$\sum_i \left(H \frac{z_i}{\Sigma_j z_j}\right)^2 / z_i = H^2 \sum_i \frac{z_i}{(\Sigma_j z_j)^2} = \frac{H^2}{\Sigma_i z_i} \qquad \text{Equation 5}$$

From Equation 5, optimization can be written as shown in Equation 6, where $$C = L + \sum \frac{R_i}{\delta_i}$$

is a constant for the given instance.

$$\max_z \sum z_i, \text{ s.t. } \sum \frac{1}{\delta_i z_i} = C \qquad \text{Equation 6}$$

Solving the optimization of Equation 6 yields Equation 7, in which $\lambda$ is the Lagrange-multiplier.

$$\frac{\partial f}{\partial z_i} = 1 - \frac{\lambda}{\delta_i z_i^2} = 0 \qquad \text{Equation 7}$$

From this analysis, several aspects by which the variable-weight algorithm can allocate load power can be determined. For example, optimal fractional scheduling of load L is independent of current intensity of future load H. Additionally, because $z_i = 1/R_i'$, currents $x_{1 \ldots m}$ should be allocated for load L such that the resistance of batteries m are proportional to the square-root of their internal resistance to SoC relationships (e.g., $R_i' = \sqrt{\delta_i/\lambda}$), respectively.

Alternately or additionally, the variable-weight algorithm may consider the derivative of a battery's internal resistance to achieve an optimal allocation of load power. In some cases, depending on the variation between internal resistances of the batteries, the square-root distribution may not be achievable. In such cases, however, charging between the multiple batteries may enable more-optimized workload allocations, such as when current intensities are negative. In yet other cases, when the batteries have similar or same internal resistance curves, an optimal solution may include leveling out the internal resistances across the batteries, possibly by inter-battery recharging.

For implementing these concepts, the partial derivative of $R_i' = \sqrt{\delta_i/\lambda}$ can be combined with $R_i' = R_i + \delta_i x_i$ to express $x_i$ as a function of $\lambda$. From $\Sigma x_i = L$, solving for $\lambda$ then yields an optimization of $x_i$ as shown in Equations 8 through 10 below.

$$x_i = \frac{1}{\sqrt{\delta_i \lambda}} - \frac{R_i}{\delta_i} \qquad \text{Equation 8}$$

-continued $$\frac{1}{\sqrt{\lambda}} = \frac{L + \Sigma(R_j/\delta_j)}{\Sigma(1/\sqrt{\delta_j})} \qquad \text{Equation 9}$$

$$x_i = w_i \cdot L + (w_i S_\Sigma - S_i) \text{ where:} \qquad \text{Equation 10}$$
$$w_i = \delta_i^{-0.5}/\Sigma_j \delta_j^{-0.5}, S_i = R_i/\delta_i, \text{ and } S_\Sigma = \Sigma_i S_i.$$

Although described in reference to the variable-weight algorithm, load allocator 210 may implement any or all of the described aspects of load allocation in conjunction with any of the other algorithms described herein.

Although shown as disparate entities, any or all of battery monitor 202, battery configurator 204, load monitor 206, workload estimator 208, and load allocator 210 may be implemented separate from each other or combined or integrated in any suitable form. For example, any of these entities, or functions thereof, may be combined generally as load manager 118, which can be implemented as a program application interface (API) or system component of operating system 114.

Battery system 200 also includes power circuitry 120, which provides an interface between load manager 118 and battery cells 122. Generally, power circuitry 120 may include hardware and firmware that enables computing device 102 to draw power from (e.g., discharge), apply power to (e.g., charge) battery cells 122, and implement various embodiments thereof. In this particular example, power circuitry 120 includes charging circuitry 214, sensing circuitry 216, and switching circuitry 218.

Charging circuitry 214 is configured to provide current by which battery cells 122 are charged. Charging circuitry 214 may implement any suitable charging profile such as constant current, constant voltage, or custom profiles provided by load manager 118, such as intra-battery charging. In at least some embodiments, charging circuitry 214 is capable of providing different amounts of current to different respective battery cells being charged concurrently.

Sensing circuitry 216 is configured to sense or monitor operational characteristics of battery cells 122. These operational characteristics may include a voltage level, an amount of current applied to, or an amount of current drawn from a respective one of battery cells 122. In some cases, sensing circuitry 216 may be implemented integral with charging circuitry 214, such as part of a charging controller or circuit that includes sensing elements (e.g., analog-to-digital converters (ADCs) and sense resistors).

Power circuitry 120 also includes switching circuitry 218, which enables load manager 118 to allocate and distribute load power of computing device 102 to battery cells 122. In some cases, portions of the load power are distributed to all or a subset of battery cells 122. In such cases, each portion of the distributed load power are different from each other. Switching circuitry 218 may be implemented using any suitable circuits, such as multiplexing circuitry that switches between battery cells 122 to facilitate connection with an appropriate set of power circuitry for battery cell sensing, power consumption, or power application (e.g., charging).

Battery cells 122 may include any suitable number or type of battery cells. In this particular example, battery cells 122 include battery cell-1 220, battery cell-2 222, and battery cell-N 224, where N may be any suitable integer. Battery cells 122 may include various homogeneous or heterogeneous combinations of cell shape, capacity, or chemistry type. Each of battery cells 122 may have a particular or different cell configuration, such as a chemistry type, shape, capacity, packaging, electrode size or shape, series or parallel cell arrangement, and the like. Accordingly, each of battery cells 122 may also have different parameters, such as internal resistance, capacitance, or concentration resistance.

Figure 3:
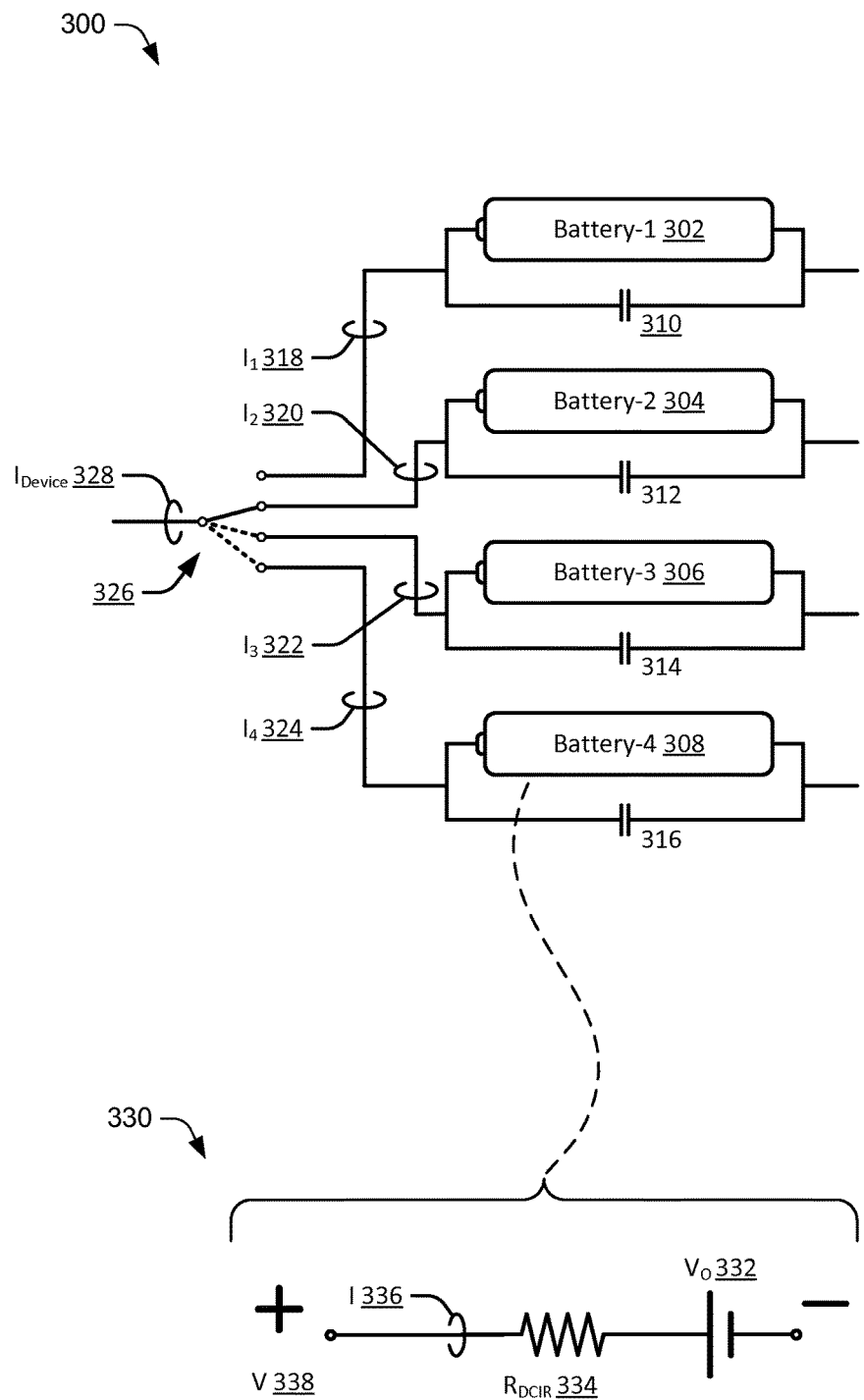
FIG. 3 illustrates an example battery configuration in accordance with one or more embodiments.

FIG. 3. Illustrates an example battery configuration 300 in accordance with one or more embodiments. Battery configuration 300 includes battery-1 302, battery-2 304, battery-3 306, and battery-4 308, each of which may be configured as any suitable type of battery. Additionally, each of batteries 302 through 308 is configured with a respective parallel bulk capacitance 310 through 316 (e.g., super capacitor), which can be effective to mitigate a respective spike of current load on a given battery.

Each of batteries 302 through 308 provide power to or receive power from computing device 102. This power may be distributed as respective portions of current, which are shown as current $I_1$ 318, current $I_2$ 320, current $I_3$ 322, and current $I_4$ 324. These individual currents are multiplexed via battery switching circuit 326 (switching circuit 326), the summation of which is current $I_{Device}$ 328. Here, note that switching circuit 326 is but one example implementation of sensing circuitry 216 as described with respect to FIG. 2. In some cases, such as normal device operation, battery switching circuit 326 switches rapidly between batteries 302 through 308 effective to draw current or power from each of them. In other cases, battery switching circuit 326 may isolate one of batteries 302 through 306 and switch between a subset of the remaining batteries to continue powering computing device 102.

Although shown as a single serial by four parallel topology (1S4P), battery configuration 300 may be implemented any suitable topology, such as multiple serial by multiple parallel topologies (e.g., 2S3P, 3S4P, or 2S2P). When implemented as a multi-serial topology, each serial level of battery configuration 300 may include an instance of switching circuit 326. This may enable power to be drawn from different combinations of serial batteries at a desired voltage.

FIG. 3 also illustrates example battery model 330, which may be used to model any of the batteries or battery cells described herein. Generally, battery model 330 can be used by load allocator 210 to calculate or determine an efficiency at which the battery cell or battery is capable of providing power. In some cases, parameters that affect a batteries efficiency are dynamic and may not be directly observable or measurable by traditional sensing techniques. In such cases, battery model 330 may be useful in estimating these parameters or their effects on an efficiency of the battery.

In this particular example, battery model 330 includes an ideal voltage source that provides power and has an open circuit voltage 332 ($V_O$ 332). Battery model 330 also includes direct current (DC) internal resistance 334 ($R_{DCIR}$ 334), which causes internal power loss as battery current 336 (I 336) passes through the battery. As noted above, $R_{DCIR}$ 334 may be determined based on a SoC for battery model 330. Battery voltage 338 (V 338) represents the terminal voltage for battery model 330 and can be effected by the losses associated with the other parameters, such as when current passes through internal resistance 334 (e.g., voltage drop associated therewith).

Example Methods

The methods described herein may be used separately or in combination with each other, in whole or in part. These methods are shown as sets of operations (or acts) performed, such as through one or more entities or modules, and are not necessarily limited to the order shown for performing the operation. In portions of the following discussion, reference may be made to the operating environment 100 of FIG. 1, the battery system 200 of FIG. 2, the battery cell configuration 300 of FIG. 3, and other methods and example embodiments described elsewhere herein, reference to which is made for example only.

Figure 4:
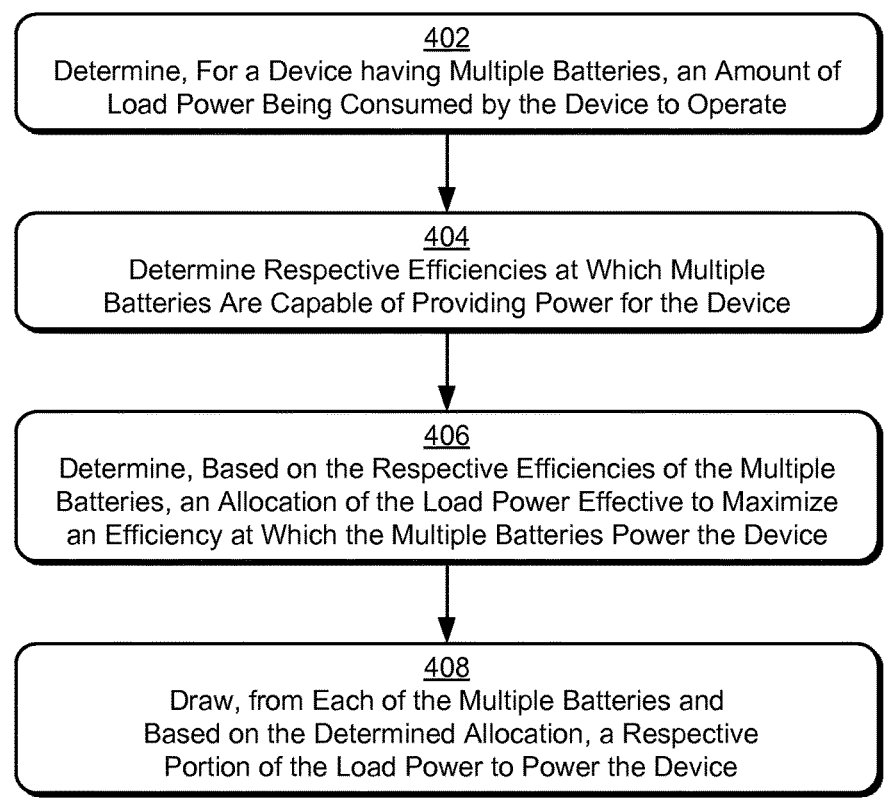
FIG. 4 illustrates an example method for allocating load power to multiple batteries of a device.

FIG. 4 depicts method 400 for estimating an internal resistance of a battery cell, including operations performed by load manager 118 or load allocator 210.

At 402, an amount of load power being consumed by a multi-battery device is determined. The multiple batteries of the device may include any suitable number or combination of batteries, such as batteries of different capacities or chemistry types. In some cases, the amount of load power being consumed may be measured by a battery monitor. In other cases, the amount of power being consumed may be estimated.

Figure 5:
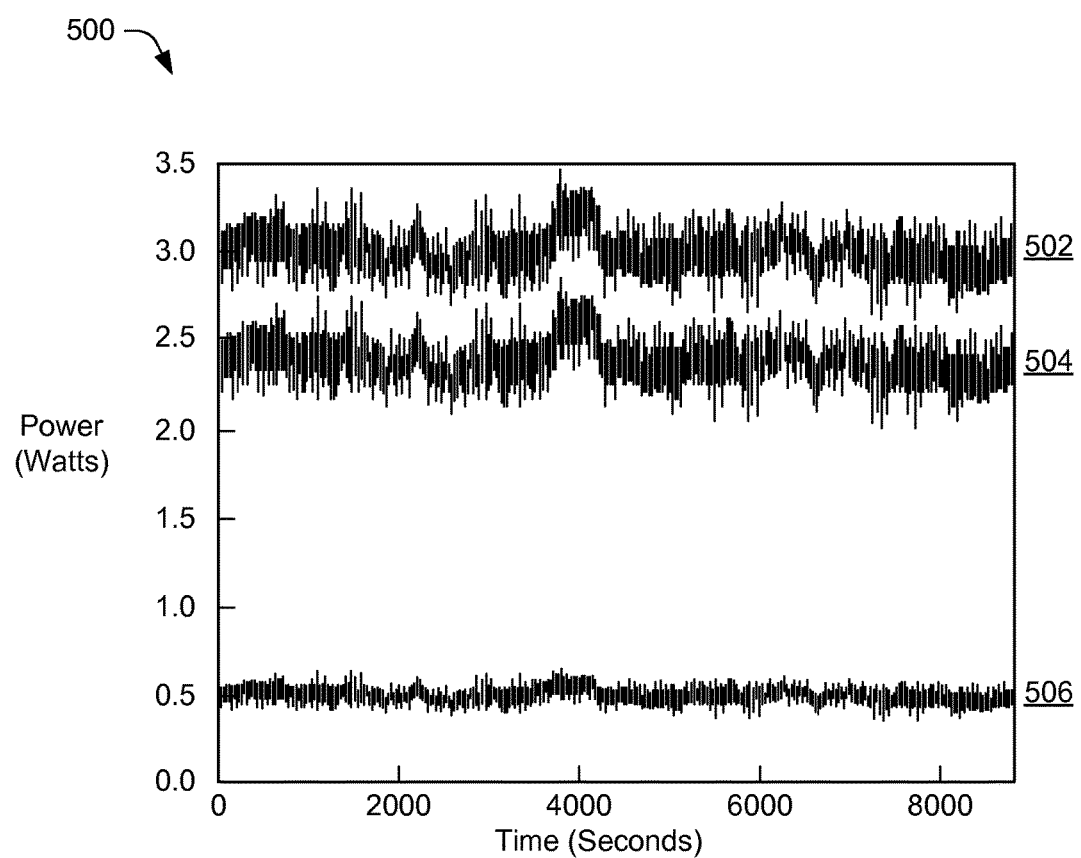
FIG. 5 illustrates an example allocation of load power to multiple batteries.

By way of example, consider a user of smart phone 104 making a bi-directional video call over a wireless data interface. During the video call, components of smart phone 104, such as processor 110, media 112, and display 124, draw load power from battery cells 122 to operate. Here, assume that load monitor 206 determines that smart phone 104 is consuming approximately 3 W of power to perform the video call. This is illustrated in power graph 500 of FIG. 5 in which device load power 502 is shown over time.

At 404, respective efficiencies at which multiple batteries are capable of providing power the device are determined. These efficiencies may indicate an amount of energy that will be wasted when various amounts of power are drawn from each of the batteries. In some cases, the efficiencies are determined based on a configuration or characteristic of each battery, such as chemistry type, capacity, SoC, internal resistance, age, temperature, and the like.

In the context of the present example, battery cells 122 of smart phone 104 include a lithium polymer cell and a lithium ceramic cell. To estimate efficiencies at which these batteries are capable of providing power, load allocator 210 receives information from battery monitor 202 and battery configurator 204. This information indicates that the lithium polymer cell's SoC is about 25% of a 1.9 Ahr capacity and the lithium ceramic cell's SoC is about 50% of a 210 mAhr capacity. From this information, load allocator 210 determines an internal resistance for the lithium polymer and lithium ceramic cells of 200 mOhms and 1 Ohm, respectively.

At 406, an allocation of the load power is determined based on the respective efficiencies of the multiple batteries. This can be effective to maximize an efficiency at which the multiple batteries power the device. In some cases, the allocation is determined based on respective internal resistances of the multiple batteries and the amount of load power being consumed by the device. The determined allocation may allocate different amount of the load power to a subset or all of the multiple batteries. Alternately or additionally, some of the multiple batteries may not receive an allocation of the load power (e.g., a portion of zero load power).

Continuing the ongoing example, load allocator 210 determines an allocation for smart phone 104's load power of approximately 3 W. Based on the internal resistances of the lithium polymer and lithium ceramic cells, load allocator determines that a weighted allocation of the load power will most efficiently utilize the remaining energy of the batteries. Here, assume that this allocation is approximately 500 mW of load power to the lithium ceramic cell and approximately 2500 mW of load power to the lithium polymer cell.

At 408, a respective portion of the load power is drawn from each of the multiple batteries based on the determined allocation. This may be effective to distribute the respective portions to a subset or all of the multiple batteries. In some cases, the respective portions are distributed to each of the multiple batteries by switching circuitry. In such cases, the switching circuitry may switch between the multiple cells effective to draw the portions of load power concurrently. As noted above, the respective portions of load power may differ from each other, and some may be approximately zero (e.g., batteries not being used).

Concluding the present example, load allocator 210 distributes the load power of smart phone 104 to battery cells 122 via switching circuitry 218 in accordance with the determined weighted allocation. Returning to FIG. 5, this is shown at 504, which indicates the load power drawn from the lithium polymer cell and at 506, which indicates the load power drawn from the lithium ceramic cell. Here, note that the combination of distributed load powers 504 and 506 provide load power 502 by which smart phone 104 operates.

Figure 6:
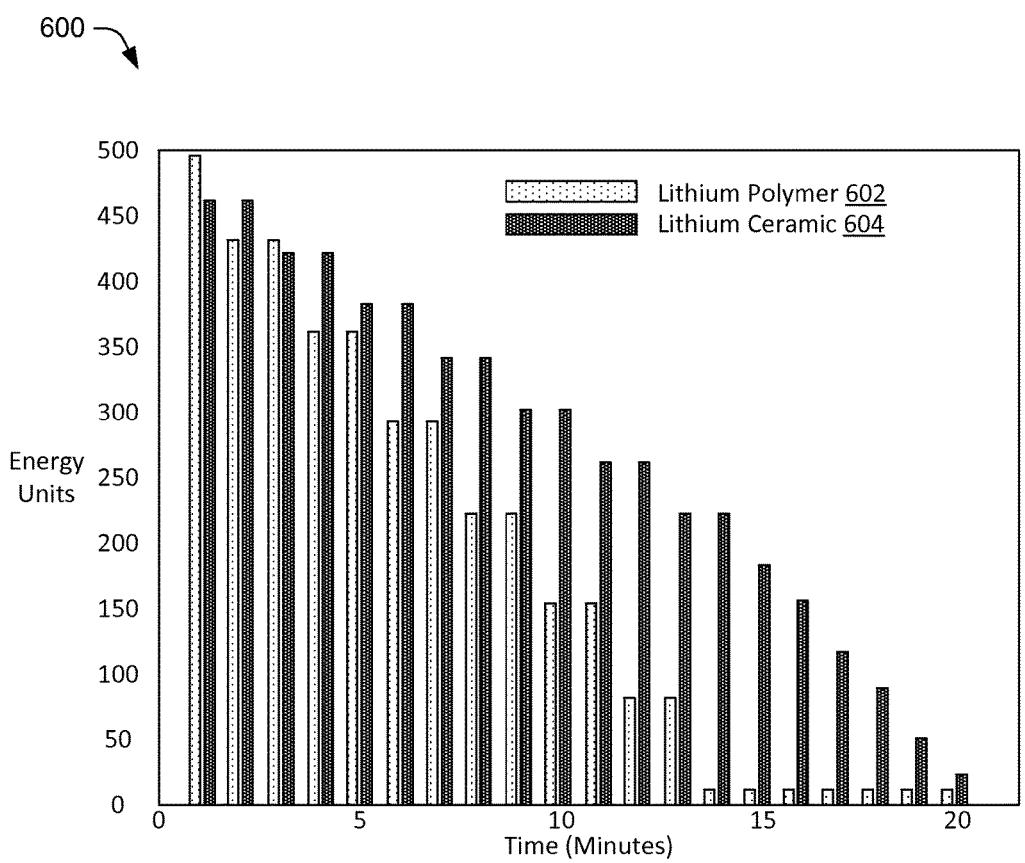
FIG. 6 illustrates an example profile of useful energy provided by multiple batteries.

In the context of energy usage, energy profile 600 of FIG. 6 illustrates the distribution of smart phone 104's energy consumption over time. Here, energy provided by the lithium polymer cell is shown as graph elements 602 and the energy provided by the lithium ceramic cell is shown as graph elements 604. As illustrated by energy profile 600, the lithium ceramic cell provides energy until it reaches an end-of-discharge at approximate minute 14, at which point energy is provided solely by the lithium polymer cell. Because an efficiency at which energy is drawn from both batteries, the lifetime of smart phone 104 extends to 20 minutes, whereas under different battery usage patterns, the lifetime would be less.

Figure 7:
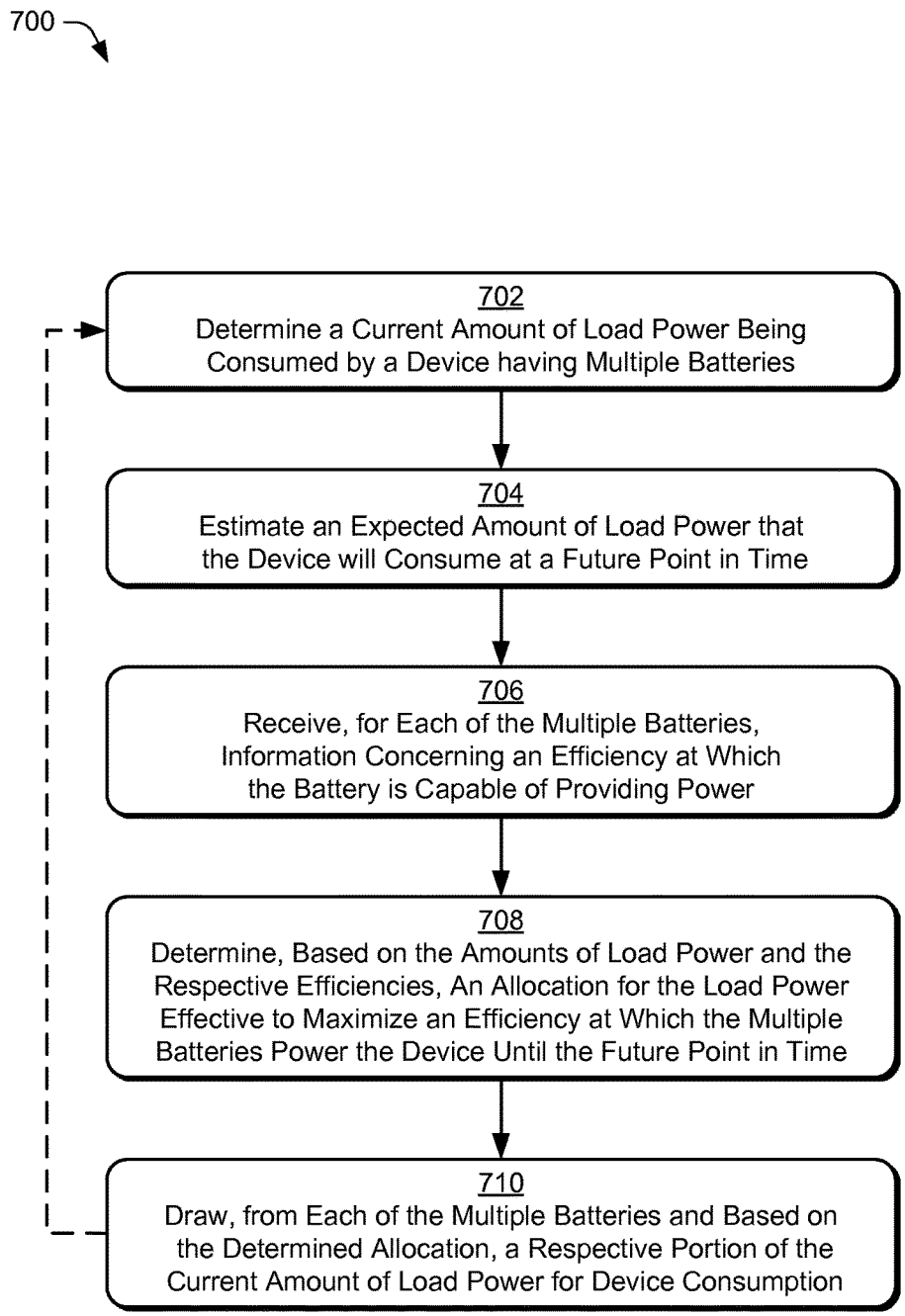
FIG. 7 illustrates an example method for allocating load power to multiple batteries over time.

FIG. 7 depicts method 700 for allocating load power to multiple batteries over time, including operations performed by load manager 118 or load allocator 210.

At 702, a current amount of load power being consumed by a multi-battery device is determined. In some cases, the current amount of power being consumed may be classified as a high-power or low-power workload. The current amount of power may be calculated based on respective voltages of multiple batteries of the device and an amount of current being consumed. Alternately or additionally, indications of power consumption are received from power management circuitry of the device or the multiple batteries.

Figure 8:
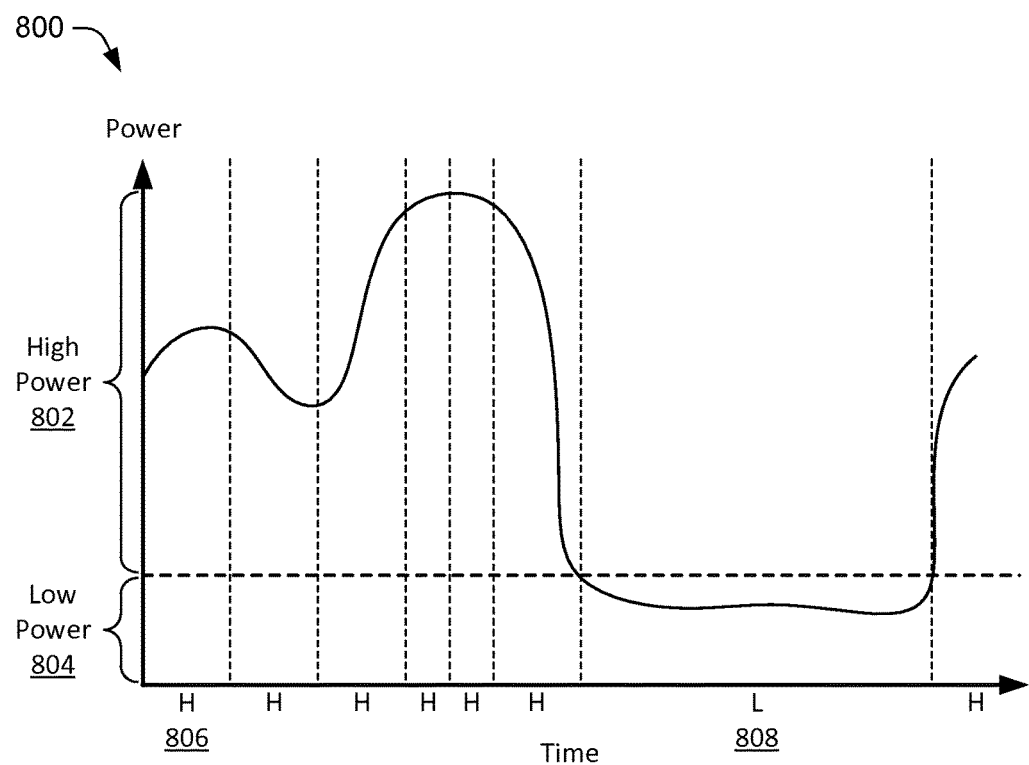
FIG. 8 illustrates an example graph of a device's workload that varies over time.

By way of example, consider a user conducting a meeting with tablet computing device 106. Here, assume the user is presenting media material via a projector and hosting a video conference call. Load monitor 206 determines that the current amount of power being consumed from battery cells 122 is approximately 5 W, which load allocator classifies as a high-power workload. Example classifications of workloads are illustrated by power graph 800 of FIG. 8, in which workload are classified as high-power 802 and low-power 804. In this particular example, the current amount of power consumed by tablet computing device 106 is classified as a high-power workload 806.

At 704, an expected amount of power that the device will consume at a future point in time is estimated. The expected amount of power may be estimated based on tasks or operations of the device that are scheduled for execution at the future point in time. As with the current amount of power, the expected amounts of power may also be classified as low-power or high-power workloads. In some cases, times at which the tasks or operations of the device are executed may be determined based on historical device use, daily activities of a user, or calendar information (e.g., workday, appointment, and meeting information).

In the context of the present example, workload estimator 208 forecasts power usage of table computing device 106 for the next several hours. To do so, workload estimator 208 queries a scheduler of operating system 114 and calendar to determine when activity levels of tablet computing device 106 are expected to change. Durations of time that correspond with these activity levels are then classified as low-power or high-power workloads, such as those shown in FIG. 8. Note, that workloads are not necessarily scheduled for uniform durations of time, but can be estimated for activity levels or thresholds for high and low levels of power consumption. Low-power workload 808 is an example of one such workload during which device activity is low while the user sleeps.

At 706, information concerning an efficiency at which each of the multiple batteries is capable of providing power is received. In some cases, the information is received from an entity of the device monitoring the multiple batteries. In other cases, a microcontroller within one of multiple batteries may transmit the information to the device. The information may include characteristics of a respective battery, such as the battery's SoC, internal resistance, age, temperature, remaining capacity, and the like. Continuing the ongoing example, load allocator 210 receives SoC information from each of battery cells 122.

At 708, an allocation of the load power is determined based on the current and expected amounts of power and the efficiencies of the multiple batteries. This can be effective to maximize an efficiency at which the multiple batteries power the device. In some cases, the allocation is determined via an algorithm that analyzes the efficiency information associated with the multiple batteries. In such cases, these algorithms may include the sequential or parallel algorithms described herein, or combinations thereof.

In the context of the present example, load allocator 210 analyzes the current workload and forecast workloads for tablet computing device 106 using the weighted algorithm. Due to the current high-power workload, load allocator 210 determines an allocation that spreads power consumption to all of battery cells 122 to minimize losses caused by their respective internal resistances.

At 710, a portion of the current load power is drawn from each of the multiple batteries based on the determined allocation. This may be effective to distribute the portions of the current load power to a subset or all of the multiple batteries. In some cases, the respective portions are distributed to each of the multiple batteries by switching circuitry. In such cases, the switching circuitry may switch between the multiple cells effective to draw the portions of load power concurrently.

Concluding the present example, load allocator 210 distributes the load power of laptop computing device 106 to battery cells 122 via switching circuitry 218 in accordance with the determined allocation. Although the allocation is determined using the weighted algorithm, other algorithms may also improve device runtimes of a device. For illustrative purposes, example runtimes are shown in Table 2 for a device having a lithium polymer cell and a lithium ceramic cell.

TABLE 2

| Algorithm | State-of-Charge (Lithium Polymer Cell) | | | |
| --- | --- | --- | --- | --- |
| | 60% | 10% | 3% | 1% |
| Sequential | 50 | 29 | 18 | 5 |
| Least-Resistance | 50 | 50 | 18 | 5 |
| Threshold (0.5) | 50 | 25 | 18 | 5 |
| Threshold (1.0) | 50 | 25 | 18 | 5 |
| Weighted (0.8) | 50 | 50 | 48 | 10 |
| Weighted (0.5) | 50 | 50 | 46 | 7 |
| Device Lifetime (Minutes) | | | | |

Optionally, method 700 may return to operation 702 to select another allocation using a same or different algorithm. This may occur when a workload of tablet computing device 106 transitions between high-power and low-power workloads, such as at low-power workload 808.

Figure 9:
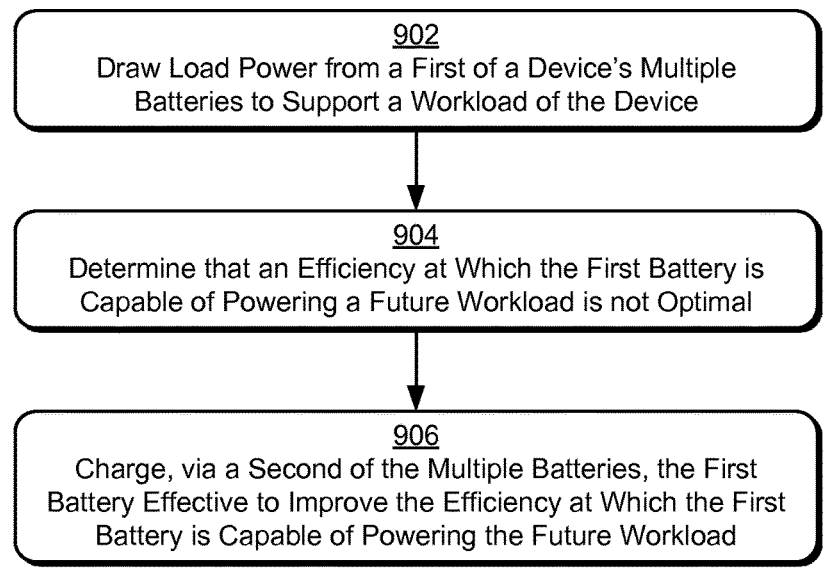
FIG. 9 illustrates an example method for recharging across multiple batteries of a device.

FIG. 9 depicts method 900 for recharging across multiple batteries of a device, including operations performed by load manager 118 or load allocator 210.

At 902, load power is drawn from a first battery of a device having multiple batteries. The multiple batteries of the device may include any suitable number of batteries of various configurations or states. In some cases, the load power is drawn in accordance with an allocation determined by a scheduling algorithm. In such cases, the scheduling algorithm may allocate the first battery's power to serve a current workload of the device. The current workload of the device may be a low-power workload, such as a predicted sleep or standby time for the device.

At 904, it is determined that an efficiency at which the first battery is capable of powering a future workload is not optimal. In some cases, the determination is responsive to changes in the future workload's estimated power consumption. In such cases, a workload estimator may forecast or re-estimate a future workload of the device as a high-power workload. For example, the workload estimator may re-estimate a series of workloads in response to unexpected user interaction. Based on the updated workload estimate, a scheduling algorithm may determine that, of the multiple batteries, the future high-power workload would be more-efficiently served by the first battery. Due to previous discharge, however, an efficiency at which the first battery can serve the high-power workload may not be optimal.

At 906, the first battery is charged from a second battery of the device to increase the first battery's state-of-charge. In some cases, the first battery is charged from all or a subset of the multiple batteries. This can be effective to improve the efficiency at which the first battery is capable of powering the future high-power workload. In particular, increasing the first battery's state-of-charge may decrease the first battery's internal resistance. By so doing, internal losses of the first battery are reduced while future workload is served.

Aspects of these methods may be implemented in hardware (e.g., fixed logic circuitry), firmware, a System-on-Chip (SoC), software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 10:
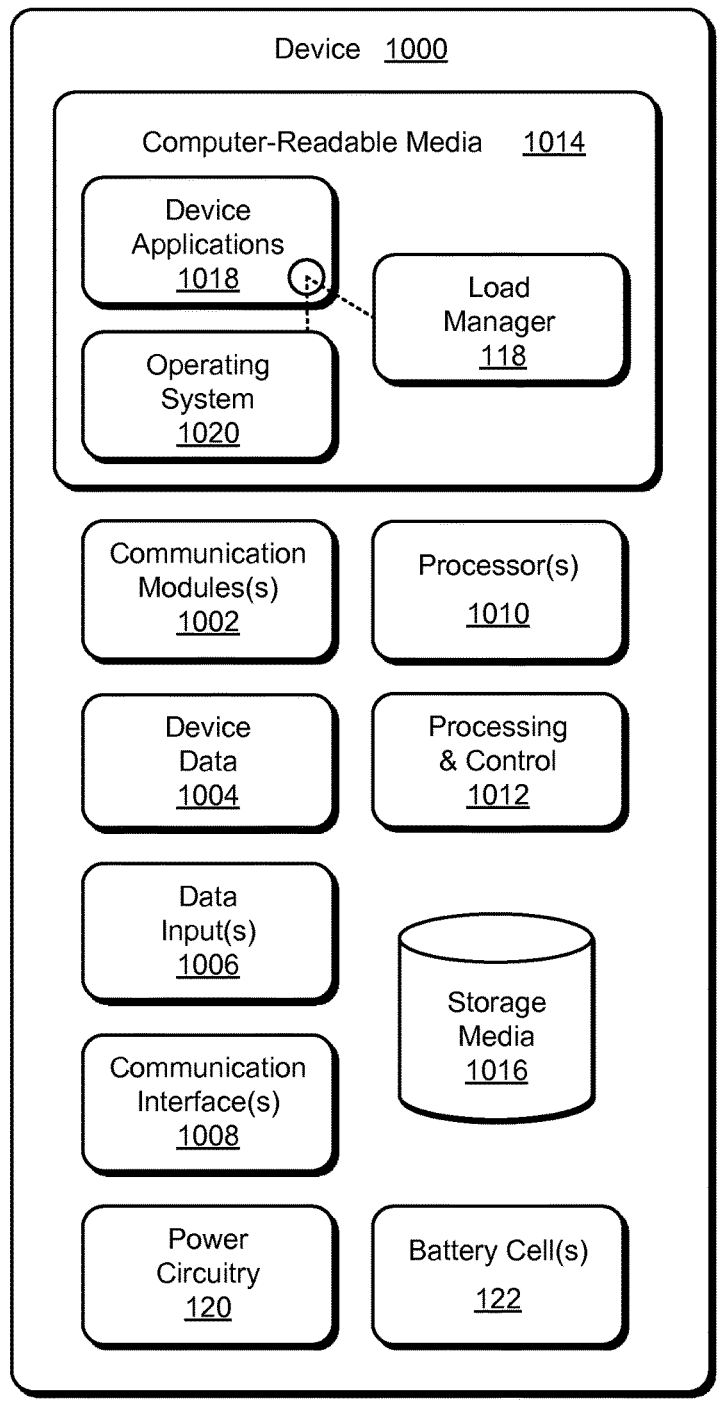
FIG. 10 illustrates an example device in which techniques of load allocation for multi-battery devices can be implemented.

FIG. 10 illustrates various components of example device 1000 that can be implemented as any type of mobile, electronic, and/or computing device as described with reference to the previous FIGS. 1-9 to implement techniques of load allocation for multi-battery devices. In embodiments, device 1000 can be implemented as one or a combination of a wired and/or wireless device, as a form of television client device (e.g., television set-top box, digital video recorder (DVR), etc.), consumer device, computer device, server device, portable computer device, user device, IoT device, communication device, video processing and/or rendering device, appliance device, gaming device, electronic device, and/or as another type of device. Device 1000 may also be associated with a user (e.g., a person) and/or an entity that operates the device such that a device describes logical devices that include users, software, firmware, and/or a combination of devices.

Device 1000 includes communication modules 1002 that enable wired and/or wireless communication of device data 1004 (e.g., received data, data that is being received, data scheduled for broadcast, data packets of the data, etc.). Device data 1004 or other device content can include configuration settings of the device, media content stored on the device, and/or information associated with a user of the device. Media content stored on device 1000 can include any type of audio, video, and/or image data. Device 1000 includes one or more data inputs 1006 via which any type of data, media content, and/or inputs can be received, such as user-selectable inputs, messages, music, television media content, recorded video content, and any other type of audio, video, and/or image data received from any content and/or data source.

Device 1000 also includes communication interfaces 1008, which can be implemented as any one or more of a serial and/or parallel interface, a wireless interface, any type of network interface, a modem, and as any other type of communication interface. Communication interfaces 1008 provide a connection and/or communication links between device 1000 and a communication network by which other electronic, computing, and communication devices communicate data with device 1000.

Device 1000 includes one or more processors 1010 (e.g., any of microprocessors, controllers, and the like), which process various computer-executable instructions to control the operation of device 1000 and to enable techniques enabling load allocation in multi-battery devices. Alternatively or in addition, device 1000 can be implemented with any one or combination of hardware, firmware, or fixed logic circuitry that is implemented in connection with processing and control circuits which are generally identified at 1012. Although not shown, device 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures. Device 1000 may be configured to operate from any suitable power source, such as battery cells 122, power circuitry 120, various external power sources (e.g., alternating-current (AC) power supplies), and the like.

Device 1000 also includes computer-readable storage media 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1000 can also include a mass storage media device 1016.

Computer-readable storage media 1014 provides data storage mechanisms to store device data 1004, as well as various device applications 1018 and any other types of information and/or data related to operational aspects of device 1000. For example, an operating system 1020 can be maintained as a computer application with the computer-readable storage media 1014 and executed on processors 1010. Device applications 1018 may include a device manager, such as any form of a control application, software application, signal-processing and control module, code that is native to a particular device, a hardware abstraction layer for a particular device, and so on.

Device applications 1018 also include any system components or modules to implement the techniques, such as load manager 118, load allocator 210, and any combination of components thereof.

CONCLUSION

Although embodiments of apparatuses of load allocation for multi-battery devices have been described in language specific to features and/or methods, it is to be understood that the subject of the appended claims is not necessarily limited to the specific features or methods described. Rather, the specific features and methods are disclosed as example implementations of allocating loads in multi-battery devices.

What is claimed is:
1. A computer-implemented method comprising:
determining, for a device having multiple batteries, an amount of load power being consumed by the device to operate;
determining, for at least some of the multiple batteries, an efficiency at which the battery is capable of providing power;
determining, via an algorithm and based on the respective efficiencies of at least some of the multiple batteries, an allocation of the load power to the multiple batteries effective to maximize an efficiency at which the multiple batteries power the device, the algorithm including one of a variable-weighted algorithm, a sequential algorithm, a least-resistance algorithm, or a threshold algorithm; and
drawing, from each of the multiple batteries via multiplexing circuitry and based on the determined allocation, a respective portion of the load power to power the device, the drawing of the respective portions of the load power comprising causing the multiplexing circuitry to switch, based on the determined allocation, between the multiple batteries to distribute consumption of the load power among the multiple batteries.

2. The computer-implemented method as described in claim 1, wherein at least two of the multiple batteries are heterogeneous batteries having different chemistry types or different capacities.

3. The computer-implemented method as described in claim 1, wherein a first energy density of one of the multiple batteries is different from a second energy density of another of the multiple batteries effective to permit the battery and the other to charge at different rates.

4. The computer-implemented method as described in claim 1, wherein at least two of the respective portions of the load power are different from each other.

5. The computer-implemented method as described in claim 1, wherein the respective portions of the load power are consumed by the device concurrently from the multiple batteries.

6. The computer-implemented method as described in claim 1, wherein one of the respective portions of the load power drawn from one of the multiple batteries is approximately zero Watts of the load power.

7. The computer-implemented method as described in claim 1, wherein the efficiency at which one of the multiple batteries is capable of providing power is determined based on one or more of the battery's state-of-charge, internal resistance, age, cycle count, temperature, chemistry, circuit topology, or capacity.

8. A computer-implemented method comprising:
determining, for a device having multiple batteries, a current amount of load power being consumed by the device to operate;
estimating, for a future point in time, an expected amount of load power that the device will consume to operate;
receiving, for the multiple batteries, information concerning respective efficiencies at which the multiple batteries are capable of providing power;
determining, via an algorithm and based on the current and expected amounts of load power and the respective efficiencies, an allocation of the load power to the multiple batteries effective to maximize an efficiency at which the multiple batteries power the device until the future point in time, the algorithm including one of a variable-weighted algorithm, a sequential algorithm, a least-resistance algorithm, or a threshold algorithm; and
drawing, from each of the batteries via multiplexing circuitry and based on the determined allocation, a respective portion of the current amount of load power to for device consumption, the drawing of the respective portions of the load power comprising causing the multiplexing circuitry to switch, based on the determined allocation, between the multiple batteries to distribute consumption of the load power among the multiple batteries.

9. The computer-implemented method as described in claim 8, wherein at least two of the respective portions of the current amount of load power are different from each other.

10. The computer-implemented method as described in claim 8, wherein the information concerning respective efficiencies of the multiple batteries includes, for each of the multiple batteries, one or more of the battery's state-of-charge, internal resistance, age, cycle count, temperature, chemistry, circuit topology, or capacity.

11. The computer-implemented method as described in claim 8, wherein at least two of the multiple batteries are heterogeneous batteries having different chemistry types or different capacities.

12. The computer-implemented method as described in claim 8, wherein a first energy density of one of the multiple batteries is different from a second energy density of another of the multiple batteries effective to permit the battery and the other to charge at different rates.

13. The computer-implemented method as described in claim 8, wherein the respective portions of the current amount of load power are drawn concurrently from the multiple batteries.

14. A system comprising:
multiple batteries configured to provide power to enable operation of the system;
switching circuitry configured to enable the power to be drawn from each of the multiple batteries;
sensing circuitry configured to measure load power consumed by the system to operate; and
a load manager configured to perform operations comprising:
determining an amount of the load power being consumed by the system;
determining, for each of the multiple batteries, a respective efficiency at which each of the multiple batteries is capable of providing power;
determining, via an algorithm and based on the respective efficiencies of the multiple batteries, an allocation of the load power to the multiple batteries effective to maximize an efficiency at which the multiple batteries power the system, the algorithm including one of a variable-weighted algorithm, a sequential algorithm, a least-resistance algorithm, or a threshold algorithm; and
distributing, based on the determined allocation, respective portions of the load power to each of the multiple batteries via multiplexing circuitry, the distribution of the respective portions of the load power comprising causing the multiplexing circuitry to switch, based on the determined allocation, between the multiple batteries to distribute consumption of the load power among the multiple batteries.

15. The system as described in claim 14, wherein the respective efficiencies for each of the multiple batteries are determined based on the amount of load power and one or more of a respective battery's state-of-charge, internal resistance, age, cycle count, temperature, chemistry, circuit topology, or capacity.

16. The system as described in claim 14, wherein at least two of the respective portions of the distributed load power are different from each other.

17. The system as described in claim 14, wherein the respective portions of the distributed load power are drawn concurrently from a subset of the multiple batteries in accordance with the determined allocation.

18. The system as described in claim 14, wherein the multiple batteries include at least two heterogeneous batteries having different chemistry types or different capacities.

19. The system as described in claim 14, wherein:
the sequential algorithm is configured to allocate the load power such that the load power is drawn sequentially from each of the multiple batteries;
the least-resistance algorithm is configured to allocate load power based on an instantaneous power level of the load and an instantaneous respective internal resistance of each of the multiple batteries; or
the threshold algorithm is configured to allocate the load power based on a predefined threshold for a state-of-charge or internal resistance of each of the multiple batteries.

20. The system as described in claim 14, wherein the allocation of load power is determined based on a hybrid algorithm that includes use of the variable-weighted algorithm, the sequential algorithm, or the least-resistance algorithm based on the threshold algorithm.

* * * * *